US010891708B1

(12) United States Patent
Ellis et al.

(10) Patent No.: US 10,891,708 B1
(45) Date of Patent: Jan. 12, 2021

(54) SHADER PROGRAM EXECUTION IN GRAPHICS PROCESSING

(71) Applicant: Arm Limited, Cambridge (GB)

(72) Inventors: Sean Tristram LeGuay Ellis, Farnham (GB); William Robert Stoye, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/695,009

(22) Filed: Nov. 25, 2019

(51) Int. Cl.
G06T 1/20 (2006.01)
G06F 9/38 (2018.01)
G06F 9/30 (2018.01)
G06F 9/48 (2006.01)

(52) U.S. Cl.
CPC ............ *G06T 1/20* (2013.01); *G06F 9/30145* (2013.01); *G06F 9/3836* (2013.01); *G06F 9/48* (2013.01)

(58) Field of Classification Search
CPC .............................. G06F 9/30145; G06T 1/20
USPC ........................................................ 345/501
See application file for complete search history.

(56) References Cited

U.S. PATENT DOCUMENTS

| 7,463,259 | B1 | 12/2008 | Kolb |
| 7,546,444 | B1 | 6/2009 | Wolrich |
| 7,594,095 | B1 | 9/2009 | Nordquist |
| 7,750,913 | B1 | 7/2010 | Parenteau |
| 7,800,620 | B2 | 9/2010 | Tarditi |
| 8,081,184 | B1 | 12/2011 | Nordquist |
| 8,473,948 | B1 | 6/2013 | LeGrand |
| 8,564,604 | B2 | 10/2013 | Jiao |
| 9,189,881 | B2 | 11/2015 | Galazin |
| 9,799,089 | B1 | 10/2017 | Chen |
| 10,115,222 | B2 | 10/2018 | Ellis |
| 10,186,069 | B2 | 1/2019 | Galazin |
| 10,275,848 | B2 | 4/2019 | Harris |
| 2004/0237074 | A1 | 11/2004 | Aronson |
| 2005/0071438 | A1 | 3/2005 | Liao |
| 2005/0081107 | A1 | 4/2005 | DeWitt |
| 2006/0098018 | A1 | 5/2006 | Tarditi |

(Continued)

FOREIGN PATENT DOCUMENTS

GB 2156358 1/2015

OTHER PUBLICATIONS

GB Combined Search and Examination Report dated Jun. 15, 2016, GB Patent Application GB1600770.0.

(Continued)

*Primary Examiner* — Thomas J Lett
(74) *Attorney, Agent, or Firm* — Vierra Magen Marcus LLP

(57) ABSTRACT

A shader program to be executed by a graphics processor has associated with it a start instruction indication, indicating the instruction in the sequence of instructions for the program at which execution of the program should be started by an execution thread, and includes a set-entry instruction, which, when executed by a thread, will cause the start instruction indication to be modified to indicate a different instruction in the sequence of instructions for the program at which execution of the program should be started by an execution thread. When executing the program, execution threads determine from the start instruction indication associated with the program, the instruction in the sequence of instructions for the program at which they should start execution of the program.

20 Claims, 10 Drawing Sheets

(56) References Cited

U.S. PATENT DOCUMENTS

| | | | |
|---|---|---|---|
| 2006/0184741 A1 | 8/2006 | Hrusecky | |
| 2008/0198166 A1 | 8/2008 | Chung | |
| 2009/0300621 A1 | 12/2009 | Mantor | |
| 2010/0007662 A1* | 1/2010 | Cox | G06T 15/40 345/420 |
| 2010/0122067 A1 | 5/2010 | Lindholm | |
| 2010/0201703 A1 | 8/2010 | Jiao | |
| 2011/0261063 A1 | 10/2011 | Jiao | |
| 2012/0079200 A1 | 3/2012 | Daily | |
| 2012/0096474 A1 | 4/2012 | Jiao | |
| 2013/0169642 A1 | 7/2013 | Frascati | |
| 2013/0298133 A1 | 11/2013 | Jones | |
| 2013/0305258 A1 | 11/2013 | Durant | |
| 2014/0354669 A1 | 12/2014 | Galazin | |
| 2015/0091894 A1* | 4/2015 | Shin | G06T 15/06 345/419 |
| 2015/0193969 A1 | 7/2015 | Nystad | |
| 2015/0378733 A1 | 12/2015 | Beylin | |
| 2018/0096516 A1* | 4/2018 | Luebke | G06T 15/06 |
| 2020/0184707 A1* | 6/2020 | Croxford | G06T 15/005 |

OTHER PUBLICATIONS

Combined Search and Examination Report dated Jan. 25, 2016; GB Patent Application No. GB1512669.1.

"Using an Effect (Direct3D 9)—Improve Performance with Preshaders," 2013 Microsoft, Seattle, WA, USA, available at http://msdn.microsoft.com/en-us/library/windows/desktop/bb206299(v=vs.85).aspx.
"Materials Compendium—Custom," 2012 Epic Games, Inc., available at http://udn.epicgames.com/Three/MaterialsCompendium.html.
Office Action dated Feb. 13, 2015, U.S. Appl. No. 13/906,132.
Response to Office Action dated Jun. 4, 2015, U.S. Appl. No. 13/906,132.
Notice of Allowance dated Jul. 22, 2015, U.S. Appl. No. 13/906,132.
Office Action dated Dec. 12, 2017, U.S. Appl. No. 15/214,170.
Response to Office Action dated Mar. 12, 2018, U.S. Appl. No. 15/214,170.
Office Action dated May 18, 2018, U.S. Appl. No. 15/214,170.
Response to Office Action dated Oct. 25, 2018, U.S. Appl. No. 15/214,170.
Notice of Allowance dated Dec. 28, 2018, U.S. Appl. No. 15/214,170.
Office Action dated Jan. 11, 2018, U.S. Appl. No. 15/401,639.
Response to Office Action dated Apr. 11, 2018, U.S. Appl. No. 15/401,639.
Notice of Allowance dated Jul. 16, 2018, U.S. Appl. No. 15/401,639.
Office Action dated Apr. 5, 2018, U.S. Appl. No. 15/433,398.
Response to Office Action dated Aug. 6, 2018, U.S. Appl. No. 15/433,398.
Notice of Allowance dated Sep. 21, 2018, U.S. Appl. No. 15/433,398.

* cited by examiner

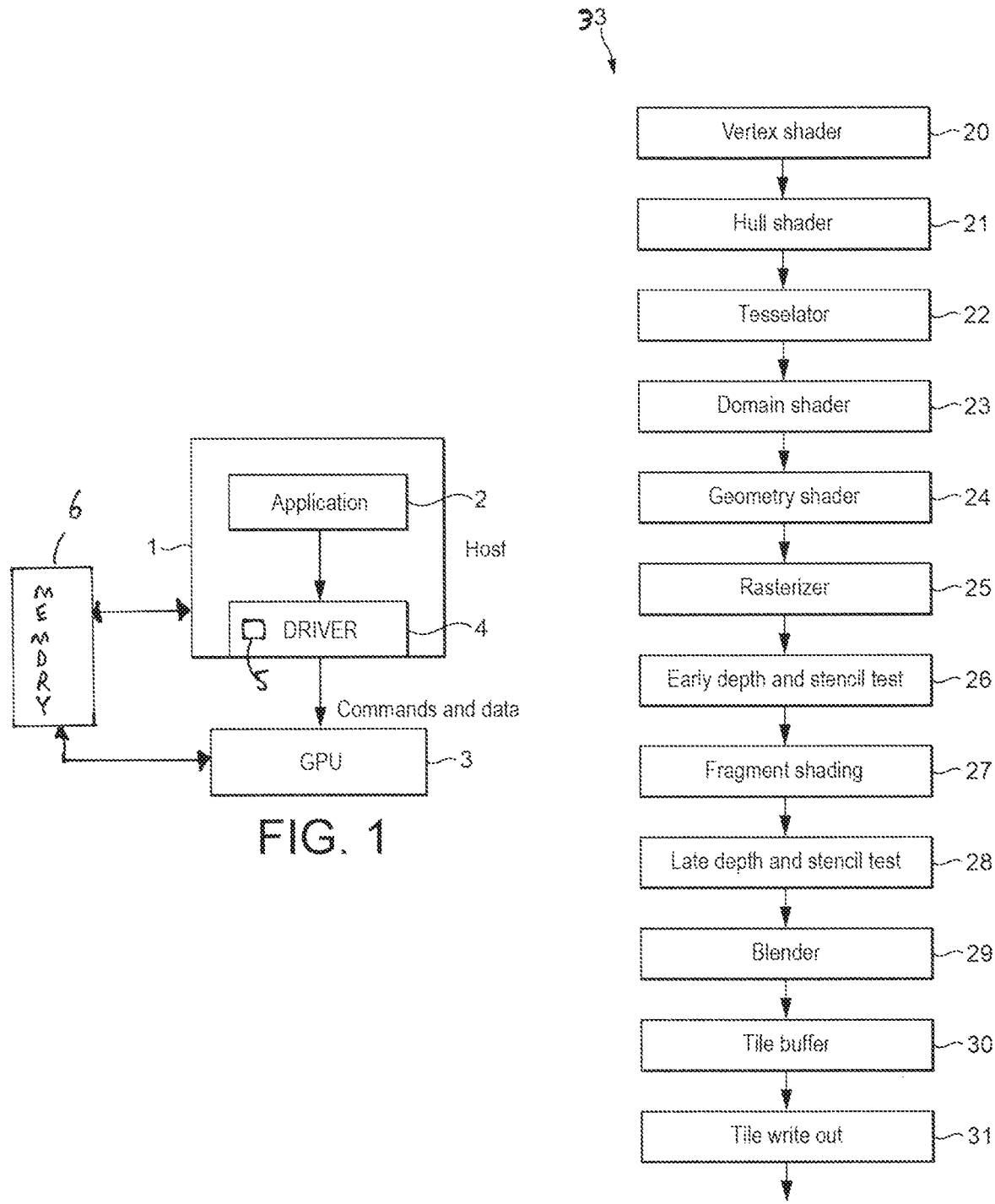

Full Shader version 300 es uniform vec4 A;
uniform vec4 B;
uniform vec4 C;

in vec4 inV
out vec4 outF void main () {
    outF = inV * A * B * C;
}

— 70

Common Workload uniform vec4 A;
uniform vec4 B;
uniform vec4 C;

out uniform temp;

temp = A * B * C;

— 71

Per-Fragment Workload uniform temp in vec4 inV
out vec4 outF void main () {
    outF = inV * temp;
}

Input

```
Full Shader version300 es uniform vec4 A;
uniform vec4 B;
uniform vec4 C;

in vec4 inV
out vec4 outF void main() {
entrypoint1:

outF = inV * A * B * C;
}
```
70

Compiled equivalent

```
Compiled Equivalent Shader version300 es uniform vec4 A;
uniform vec4 B;
uniform vec4 C;

out uniform vec4 temp;

in vec4 inV
out vec4 outF void main() {
entrypoint1:
  temp = A * B * C;
  SET_ENTRY
entrypoint2:
  outF = inV * temp;
}
```
52 → (arrow to SET_ENTRY)

80

} Execute once
} Execute for each thread

Fig. 8

SHADER PROGRAM EXECUTION IN GRAPHICS PROCESSING

BACKGROUND

The technology described herein relates to graphics processing systems, and in particular to the operation of graphics processing systems that include one or more programmable processing stages ("shaders").

Graphics processing is typically carried out in a pipelined fashion, with one or more pipeline stages operating on the data to generate the final render output, e.g. frame that is displayed. Many graphics processing pipelines now include one or more programmable processing stages, commonly referred to as "shaders". For example, a graphics processing pipeline may include one or more of, and typically all of, a geometry shader, a vertex shader and a fragment (pixel) shader. These shaders are programmable processing stages that execute shader programs on input data values to generate a desired set of output data (e.g. appropriately shaded and rendered fragment data in the case of a fragment shader) for processing by the rest of the graphics pipeline and/or for output. The shaders of the graphics processing pipeline may share programmable processing circuits, or they may each be distinct programmable processing units.

A shader program to be executed by a given "shader" of a graphics processing pipeline will be provided by the application that requires the processing by the graphics processing pipeline using a high-level shader programming language, such as GLSL, HLSL, OpenCL, etc. This shader program will consist of "expressions" indicating desired programming steps defined in the relevant language standards (specifications). The high-level shader program is then translated by a shader language compiler to binary code for the target graphics processing pipeline. This binary code will consist of "instructions" which are specified in the instruction set specification for the given target graphics processing pipeline.

A graphics processing pipeline shader thus performs processing by running small programs for each "work item" in an output to be generated, such as a render target, e.g. frame (a "work item" in this case would be usually a vertex or a sampling position (e.g. in the case of a fragment shader)). Where the graphics processing pipeline is being used for "compute shading" (e.g. under OpenCL or DirectCompute) then the work items will be appropriate compute shading work items. This shader operation generally enables a high degree of parallelism, in that a typical render output, e.g. frame, features a rather large number of work items (e.g. vertices or fragments), each of which can be processed independently.

In graphics shader operation, each work item is processed by means of an execution thread which will execute the shader program in question for the work item in question. As there will typically be a large number of work items (e.g. vertices or sampling positions), and thus corresponding threads, to be processed for a given shader program, a graphics processing system can be considered to be a massively multi-threaded system.

The Applicants have recognised that many graphics shader programs will include operations (expressions) that will produce identical values for sets of plural threads to be executed (e.g. for every thread in a draw call).

For example, the OpenGL ES vertex shader:
uniform mat4 a;
uniform mat4 b;
uniform mat4 c;
attribute vec4 d;
void main( )
{
gl_Position=a*b*c*d;
}
will produce identical values for the computation of "a*b*c" for each thread (where each thread represents a given vertex), as the data inputs are uniform variables. Thus if this computation could be executed once and the result shared between plural threads, the execution of the shader program could be made more efficient.

The Applicants have previously proposed in their earlier UK patent application no. GB-A-2516358 the use of a "pilot" shader program to execute once expressions that will produce identical values for a set of plural threads (e.g. for a draw call), and then a "main" shader program which executes for each work item, using the results of the "pilot shader" instead of recalculating the common expressions each time.

However, notwithstanding this, the Applicants believe that there remains scope for improvements to execution of shader programs in graphics processing pipelines that include one or more shader stages.

BRIEF DESCRIPTION OF THE DRAWINGS

A number of embodiments of the technology described herein will now be described by way of example only and with reference to the accompanying drawings, in which:

FIG. 1 shows an exemplary computer graphics processing system;

FIG. 2 shows schematically a graphics processing pipeline that can be operated in the manner of the technology described herein;

FIG. 7 shows an example of a shader program;

FIG. 8 shows an example of a shader program configuration in an embodiment of the technology described herein;

Like reference numerals are used for like components where appropriate in the drawings.

DETAILED DESCRIPTION

Figure 3:
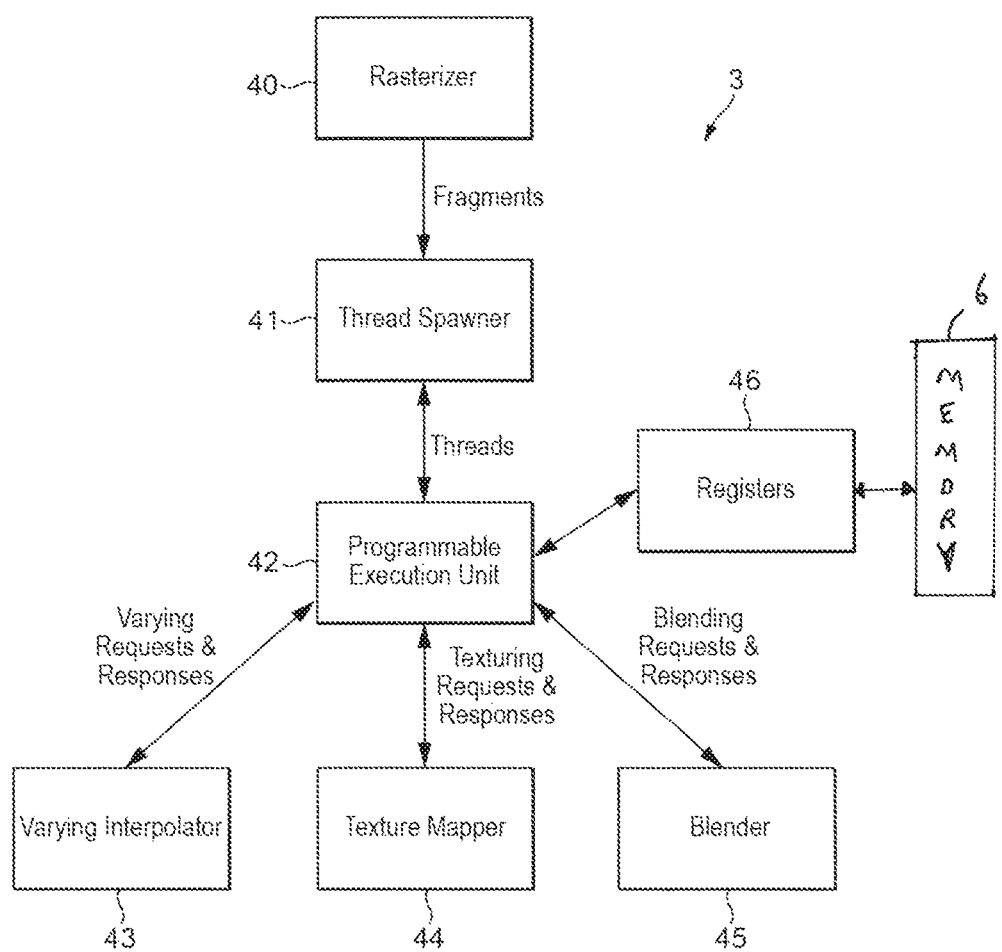
FIG. 3 shows schematically a graphics processing unit.

A first embodiment of the technology described herein comprises a method of operating a graphics processing system that comprises a graphics processor comprising a programmable execution unit operable to execute programs for execution threads to perform processing operations;

the method comprising:

including in a program to be executed by the programmable execution unit of the graphics processor, the program comprising a sequence of instructions to be executed, and having associated with it a start instruction indication, indicating the instruction in the sequence of instructions for the program at which execution of the program should be started by an execution thread:

a "set-entry" instruction, which, when executed by a thread, will cause the start instruction indication to be modified to indicate a different instruction in the sequence of instructions for the program at which execution of the program should be started by an execution thread;

the method further comprising:

issuing the program to the programmable execution unit of the graphics processor for execution; and executing the program for a set of plural execution threads;

wherein:

executing the program for the set of plural execution threads comprises:

for each execution thread executing the program, determining from the start instruction indication associated with the program, the instruction in the sequence of instructions for the program at which the thread should start execution of the program, and starting execution of the program for the thread at the indicated instruction; and an execution thread, when executing the program, in response to the "set-entry" instruction:

causing the start instruction indication to indicate a different instruction in the sequence of instructions for the program at which to start execution of the program, such that execution threads that start their execution of the program thereafter will start their execution of the program at the indicated different instruction in the instruction sequence.

A second embodiment of the technology described herein comprises a graphics processing system comprising:

a graphics processor comprising a programmable execution unit operable to execute programs for execution threads to perform processing operations; and a processing circuit configured to:

associate with a program to be executed by the programmable execution unit of the graphics processor, the program comprising a sequence of instructions to be executed, a start instruction indication, indicating the instruction in the sequence of instructions for the program at which execution of the program should be started by an execution thread;

include in the program to be executed by the programmable execution unit of the graphics processor, a "set-entry" instruction, which, when executed by a thread, will cause the start instruction indication associated with the program to be modified to indicate a different instruction in the sequence of instructions for the program at which execution of the program should be started by an execution thread;

and issue the program to the programmable execution unit of the graphics processor for execution;

wherein:

the graphics processor comprises:

an execution thread issuing circuit configured to issue execution threads to the programmable execution unit;

and the programmable execution unit of the graphics processor is configured to, when executing the program for an execution thread:

determine from the start instruction indication associated with the program, the instruction in the sequence of instructions for the program at which the thread should start execution of the program, and start execution of the program for the execution thread at the indicated instruction;

and when an execution thread, when executing the program, executes the "set-entry" instruction:

cause the start instruction indication to indicate a different instruction in the sequence of instructions for the program at which to start execution of the program, such that execution threads that start their execution of the program thereafter will start their execution of the program at the indicated different instruction in the instruction sequence.

The technology described herein relates to the execution of programs (e.g. shader programs) in graphics processing systems and by graphics processors. In the technology described herein, execution threads that are executing a program determine which instruction in the sequence of instructions for the program to start their execution of the program at from an indication of a "start" instruction at which to start the execution of the program that is provided in association with the program. Furthermore, the program includes a "set-entry" instruction which when executed will change the "start" instruction that is indicated for the program. This has the effect of changing the instruction in the program at which later execution threads then start their execution of the program.

The effect of this then is that different execution threads executing a program can be caused to start executing instructions in the program at different start (entry) points in the program (by including an appropriate "set-entry" instruction in the program). In other words, a program can be configured to have plural possible "start" ("entry") points for execution threads, such that threads can be triggered and controlled to start their execution of the program at different points within the program (e.g., and in an embodiment, at a point that is more appropriate for the execution thread in question).

Furthermore, this is achieved by triggering the change of program "start" ("entry") point for execution threads through the execution of an instruction in the program itself, that modifies the indicated start ("entry") point in the program for the execution threads. This provides a particularly straightforward mechanism for changing the start (entry) point in a program for execution threads, without the need, e.g., to have to provide such a mechanism more globally for the program execution.

The technology described herein can, accordingly, and as will be discussed further below, provide a particularly convenient and straightforward mechanism for, e.g., causing later execution threads that are executing a program to start their execution of that program at a later point in the sequence of instructions for the program, thereby, for example, and in an embodiment, skipping (omitting) one or more initial instructions in the program.

For example, the technology described herein can be used to cause some threads to execute a program from the beginning (and thereby, e.g., perform common operations in the program), with other threads being triggered to start their execution of the program at a later point (thereby, e.g., and in an embodiment, avoiding executing the common operations for those threads). This can then have the effect and advantage of reducing the number of threads for which the "common" operations (expressions) are performed, thereby making overall execution of the program more efficient.

(The Applicants have recognised in this regard that it can be possible to arrange for "common" operations (expressions) in a program (e.g. expressions (operations) that will produce the same value(s) each time they are executed for some or all of the threads in a set of threads that are executing the program) to be executed at or near the beginning of the shader program, with the "non-common" operations (expressions) (i.e. that will (potentially) produce a different value(s) for each thread in a set of threads that are executing the program) then being performed later in the program.)

Thus, in the technology described herein, the number of threads that execute instructions that perform "common" expressions in a program can be reduced. However, the technology described herein does not require the generation and execution of a separate "pilot shader" program to do this, and therefore avoids issues that can arise with executing pilot shader programs (such as the fact that the pilot shader may execute only on a single thread (and therefore be relatively inefficient on typically massively multi-threaded graphics processing pipeline architectures)).

The graphics processor may be any suitable and desired graphics processor that can execute (shader) programs to perform processing operations.

Correspondingly, the programmable execution unit can be any suitable and desired unit (circuit) that is able to execute (shader) programs.

There may be a single or plural programmable execution units. Where there are plural programmable execution units, each execution unit can in an embodiment operate in the manner of the technology described herein.

The (and each) programmable execution unit will be, and is in an embodiment, implemented as an appropriate programmable processing circuit or circuits, that is operable to receive execution threads to be executed, and to execute appropriate (shading) programs for those threads to generate a desired output.

The (and each) programmable execution unit may be configured as desired, e.g. as a set of one or more functional units (circuits), operable to perform respective processing operations. The programmable execution unit may (and correspondingly its functional units may), for example, be arranged as a plurality of respective execution lanes, so that the execution unit can execute the same instruction in parallel for plural threads of a thread group.

The graphics processor in an embodiment comprises appropriate control circuit(s) (control logic) for controlling the programmable execution unit to cause it to perform the desired and appropriate processing operations. Such control circuit(s) can, and in an embodiment do comprise, for example, one or more of instruction fetch circuit(s) and instruction decode circuit(s) that are operable to fetch and decode instructions to be executed so as to cause the execution unit to execute the required instructions.

The technology described herein is in an embodiment used for and when the graphics processor (the programmable execution unit of the graphics processor) is executing a graphics shader program, i.e. is executing a program (a set of instructions) to perform processing operations of a (programmable) shading stage of a graphics processing pipeline, such as a geometry shader, vertex shader, a fragment shader, or a compute shader.

The programmable execution unit of the graphics processing pipeline can be acting as any suitable and desired programmable shading stage ("shader") of a graphics processing pipeline (and that a graphics processing pipeline can include or act as). Thus the programmable execution unit may be operating as, e.g. a geometry shader, a vertex shader, a fragment shader, or a compute shader.

The programmable execution unit may operate solely as one type of shader, but it will be appreciated in this regard that the programmable execution unit may typically be able to (and in an embodiment can) execute plural different types of shader, i.e. such that there may be one or more programmable stages of the graphics processing pipeline that the execution unit may be appropriately programmed, e.g. at different times, to function as.

In an embodiment, the operation in the manner of the technology described herein is used for all (programmable) shading stages that the graphics processor may be required to execute.

Correspondingly the (shader) program that is issued to the (programmable) execution unit and executed by the execution threads can be any suitable and desired shader program for execution by a graphics processor.

For example, the program may be a geometry shader program (a program for executing geometry shading operations), a vertex shader program (a program for executing vertex shading operations), a fragment shader program (a program for executing fragment shading operations), or a compute shader program (a program for executing compute shading operations). Other arrangements would, of course, be possible.

The techniques of the technology described herein can be used in respect of some but not all of the shader programs to be executed, e.g. for a given "unit" of processing (e.g. draw call), but in an embodiment are used in respect of all shader programs to be executed for a given "unit" of processing (e.g. draw call).

The execution threads that are issued to the execution unit to execute the program will represent appropriate "work items" for the (shader) program in question. Thus they may, for example, represent vertices for a vertex shading program, or sampling points (or pixels) for a fragment shading program, or "work items" for a compute shading program, etc.

The plural execution threads that are issued to the execution unit for execution can comprise any suitable and desired set of plural execution threads. Thus they may, for example, comprise all the threads that are to be executed to generate the desired output, e.g. frame, or part (e.g. a tile) of a frame, in question, or they may be a subset of threads within that overall set of threads (e.g. the set of threads to be executed for a given draw call of an overall output that is being generated). The set of threads could also be the threads for a given work group or set of work groups for which the shader program is to be executed (e.g. when the graphics processor is performing compute shading operations). Other arrangements would, of course, be possible.

The execution threads can be issued to the execution unit by any suitable and desired component or element of the graphics processor. In an embodiment there is a thread spawner (circuit) that operates to issue the execution threads (and/or groups of execution threads) to the programmable execution unit.

The (shader) program to be executed by the programmable execution unit will comprise a sequence of instructions to be executed by the execution threads. As well as the particular "set-entry" instruction that changes the "start" point for execution of the program in the manner of the technology described herein, the sequence (set) of instructions to be executed for the program can include any desired and suitable instructions that would typically be included in and used for a (shader) program. Thus the program instructions may comprise, for example, one or more or all of: arithmetic (mathematical) operations (add, subtract, multiply, divide, etc.); bit manipulations (invert, swap, shift, etc.); logic operations (AND, OR, NAND, NOR, NOT, XOR);

load-type instructions (such as varying, texturing or load instructions); and store-type instructions (such as blend or store instructions).

Other arrangements would, of course, be possible.

The program to be executed by the programmable execution unit has associated with it a "start instruction" indication, indicating the instruction in the sequence of instructions for the program at which execution of the program should be started by an execution thread. That start instruction indication is then used to determine which instruction in the sequence of instructions for the program the execution threads should start their execution of the program at.

The start instruction indication for a program can take any suitable and desired form. In an embodiment it is provided in the form of state data, such as a program descriptor (a shader descriptor), that is associated with and provided for the program.

The start instruction indication can indicate the instruction at which execution of the program should be started by an execution thread in any suitable and desired manner. For example, and in an embodiment, it may indicate a program counter value to indicate the instruction at which execution of the program should be started by an execution thread. The start instruction indication could in this case indicate and comprise an absolute program counter value, or it could, for example, indicate an offset to a base (reference) program counter value, if desired.

The program will be initially associated with a start instruction indication indicating an "initial" start instruction for execution threads executing the program. Then, when the "set-entry" instruction is executed, the start instruction indication will be changed (e.g., and in an embodiment, the program counter value indicated by the start instruction indication will be changed) to indicate a different instruction in the instruction sequence at which execution threads should start their execution of the program.

The effect of this then will be, as discussed above, that execution of the program will be started at different instructions within the sequence of instructions for the program for different ones of the execution threads (depending upon whether the execution threads start their execution of the program before or after a thread has executed the "set-entry" instruction).

Correspondingly executing the program for the execution threads will comprise executing the program for one or more of the execution threads starting at a first point in the sequence of instructions for the program, and executing the program for another one or ones of the execution threads (i.e. those threads that execute the program after the set-entry instruction has been executed) starting at a different point in the sequence of instructions for the program.

The effect of this then is that there will be two start (entry) points for execution threads in the program being executed, a first start (entry) point that is indicated by the start instruction indication that is initially provided for the program, and a separate, different start (entry) point that is triggered by the execution of the "set-entry" instruction.

Correspondingly, for at least a first execution thread executing the program, that execution thread will determine from the start instruction indication associated with the program the initial start instruction in the sequence of instructions for the program at which the thread should start execution of the program, and start its execution of the program at that "initial" start instruction, with that execution thread then subsequently executing the set-entry instruction to cause the start instruction indication to indicate a different instruction in the sequence of instructions at which to start execution of the program. A subsequent (e.g. second) execution thread starting its execution of the program after the first execution thread (at least) has executed the set-entry instruction will then, accordingly, determine from the start instruction indication associated with the program the new, different instruction at which to start execution of the program, and therefore start its execution of the program at that different instruction in the sequence of instructions for the program.

Thus, executing the program for the execution threads will comprise executing the program for one or more of the execution threads starting at a first point (instruction) in the sequence of instructions for the program (as indicated in the initial start instruction indication associated with the program), but then executing the program for another one or ones of the execution threads starting at a different point in the sequence of instructions for the program after the set-entry instruction has been executed by an execution thread.

The two different start (entry) points for execution threads in a program can be selected and positioned in the sequence of instructions for the program as desired. The initial start (entry) point (i.e. that is indicated by the start instruction indication initially provided for the program) should be, and is in an embodiment, the start of the program (i.e. at the first instruction in the sequence of instructions for the program, and from which a thread may be correctly executed to completion, without, for example, relying on data output by any other thread).

The position of the other start (entry) point in the program that is triggered by execution of the "set-entry" instruction can be selected as desired.

In an embodiment, this second, later, start (entry) point in the shader program is after some, and in an embodiment after all, of the instructions in the program that calculate common expressions in the program (i.e. that will produce the same result for each thread (work item) in the set of plural threads (work items) in question). In an embodiment execution of the "set-entry" instruction changes the entry (start) point for execution threads in the program to the point in the program that is after at least some, and in an embodiment all, of the (and in an embodiment immediately after some or all of the) instructions that perform common expressions in the program.

Thus, in an embodiment, the "initial" start (entry) point indicated for a program is before at least some, and in an embodiment all, of the instructions that perform common expressions in the program, with execution of the "set-entry" instruction then changing the entry (start) point for execution threads in the program to a point in the program that is after at least some, and in an embodiment all, of the (and in an embodiment immediately after some or all of the) instructions that perform common expressions in the program.

The effect of this then is that, for example, execution threads can be controlled to initially execute the "common" expressions in the program being executed, but with later threads then being triggered to start the execution of the program at a later point in the program, thereby skipping (omitting) those common expressions and operations. This can thereby provide, in effect, "pilot shader" operation, but without the need, for example, to actually provide and execute a completely separate "pilot shader" program.

The "set-entry" instruction which triggers the modification of the start instruction indication to indicate a different start instruction at which execution of the program should be started by an execution thread can be included in the sequence of instructions for a program at any suitable and desired point within that sequence of instructions.

In an embodiment, the "set-entry" instruction is included in the sequence of instructions before the new start (entry) point in the sequence of instructions that the "set-entry" instruction will set. In an embodiment, the "set-entry" instruction is included in the sequence of instructions for the program immediately before the instruction in the sequence of instructions that the "set-entry" instruction will set as the new start (entry) point for threads that are executing the program. Thus, in an embodiment the next instruction in the sequence of instructions after the "set-entry" instruction will be the instruction that the "set-entry" instruction sets as the (start entry) point for execution of the program.

Thus, in an embodiment the sequence of instructions for the program will include a first sub-sequence of instructions, e.g., and in an embodiment, that execute common operations for the program, followed by the "set-entry" instruction, followed (in an embodiment immediately) by the instruction at which threads will start their execution of the program once the set-entry instruction has been executed to change the start (entry point) for threads executing the program.

The "set-entry" instruction can cause the start instruction indication to be modified to indicate a different instruction in the sequence of instructions in any suitable and desired manner.

In an embodiment, the "set-entry" instruction modifies a "local" copy of the start instruction indication to indicate a different instruction in the sequence of instructions for the program at which to start execution of the program, with execution threads using that local copy of the start instruction indication to determine which instruction of the program to start their execution of the program at.

Thus, in this case, and in an embodiment, the program will have associated with it a start instruction indication, and when the program is to be executed, a copy of that start instruction indication for the program will be stored, e.g., and in an embodiment, cached, in an embodiment locally, to the programmable execution unit, with that local copy of the start instruction indication then being used by and for the execution threads to determine which instruction in the sequence of instructions for the program they should start their execution of the program at.

The "local" copy of the start instruction indication can be stored, e.g. cached, as desired, such as, and in an embodiment, in or accessible to the thread/thread group spawner (circuit) (that issues execution threads/thread groups for execution).

The "set-entry" instruction will then modify the (local) copy of the start instruction indication to indicate a different instruction at which to start execution of the program, but the "original" start instruction indication associated with the program will not be modified. (The "set-entry" instruction will only write to the (locally) stored copy of the start instruction indication, but will not write to (will not change) the "original" start instruction indication that is, e.g., stored in main memory in association with the program.) This will then facilitate, for example, executing the program again for a different set of execution threads at a later time, but with the correct (initial) start instruction indication for that later execution of the program by a different set of execution threads.

Thus, in an embodiment, a program to be executed has provided for it an "original" start instruction indication, but then in operation in the manner of the technology described herein, a copy of that "original" start instruction indication is provided to the programmable execution unit (and, e.g., and in an embodiment, stored, e.g. cached, locally to the programmable execution unit), and that copy of the "original" start instruction indication is used for and by the execution threads to determine the instruction in the sequence of instructions for the program at which they should start their execution of the program, and the execution of the "set-entry" instruction modifies that copy of the "original" start instruction indication (but does not modify the "original" start instruction indication associated with the program) to thereby cause execution threads to start their execution of the program at a different instruction in the instruction sequence.

In this case, the copy of the start instruction indication can then be discarded once the set of threads in question have all appropriately executed the program.

The "set-entry" instruction can cause the start instruction indication (e.g. the (local) copy of the start instruction indication) to be modified to indicate a different instruction in the sequence of instructions in any suitable and desired manner. For example, the "set-entry" instruction could explicitly indicate (e.g. in terms of a program counter value) the new, different instruction that the start instruction indication should indicate. Alternatively, the new, different instruction could be implicitly derived by the "set-entry" instruction being executed, for example by assuming that it is the next instruction in the sequence (e.g. the next program counter value) immediately after the "set-entry" instruction itself.

The thread execution start (entry) points in a program can be determined for and provided in or in relation to the program in any suitable and desired manner and by any suitable and desired element of the overall data processing system.

Correspondingly, the "set-entry" instruction can be provided for and included in a program in any suitable and desired manner and by any suitable and desired element of the overall data processing system.

In one embodiment, the thread execution start (entry) points in a program, and the corresponding set-entry instruction, can be set and included in a program to be executed by the graphics processor by the application programmer. In this case therefore, a high level program to be executed by the graphics processor that is provided by the application that requires the processing by the graphics processor can be configured to, and will, explicitly include an appropriate set-entry instruction that sets a desired thread execution start (entry) point in the program. In this case therefore, the, e.g. compiler, for the graphics processor will receive the application program that includes the set-entry instruction and compile that program to issue the program for execution by the programmable execution unit of the graphics processor including the set-entry instruction (and the corresponding multiple thread execution start (entry) points) in the appropriate manner.

In an embodiment, the data processing system, and in an embodiment the appropriate compiler for the graphics processor, is also or instead (and in an embodiment also) operable to and configured to include a set-entry instruction (and thus set plural thread execution start (entry) points) in a program itself (i.e. without an explicit indication of that from the application program that is received from the application for executing). In this case therefore, there will be no explicit indication of a set-entry instruction in the application program that is received for compiling and execution, but rather the, e.g. compiler, for the graphics processor will operate to analyse an application program that is received and to add an appropriate set-entry instruction (and accordingly set plural execution start (entry) points in the program), and then issue the compiled program, including the added set-entry instruction, to the programmable execution unit for execution.

In this case, the, e.g., and in an embodiment, compiler, in an embodiment analyses the (shader) program code that is provided, e.g. by an application on the host processor that requires the processing by the graphics processor, and determine whether plural start points in the program execution are possible, and if so, where the start points should be, and then adds an appropriate set-entry instruction to the program when compiling it for execution, accordingly.

Other arrangements would, of course, be possible.

Thus, in an embodiment, the program thread execution start points are determined and set by the compiler (the shader compiler) for the graphics processor. Thus the compiler in an embodiment determines appropriate start points in the program. Having the compiler identify the thread execution start points has the advantage that the compiler is able to assess the program to determine if it is possible to include later start points in a program to be executed.

Correspondingly, in an embodiment, the "set-entry" instruction is provided for and included in (added to) the program by the compiler (the shader compiler) for the graphics processor.

Thus, in an embodiment, the compiler analyses the (shader) program code that is provided, and determines whether plural start points in the program execution are possible, and if so, where those start points should be, and includes a set-entry instruction in the program accordingly.

In an embodiment, the compiler is also operable to (where this is possible) re-order expressions (operations) in the program so as to, e.g., provide an opportunity to include a later thread start point in the program execution, and/or so as to allow for the more efficient inclusion and use of a later thread start point in the execution of the program.

In this regard, the compiler in an embodiment operates to place (the instructions for) any program expressions (operations) that will produce a common (the same) result for all the threads (work items) of a set of threads (work items) that the program is to be executed for earlier in (and in an embodiment at the beginning of) the execution order of the program. In an embodiment, the compiler also identifies and operates to place (the instructions for) any program expressions (operations) that will produce common (the same) results for a subset of the threads (work items) of the set of threads (work items) that the program is to be executed for earlier in (towards the beginning of) the program execution, and in an embodiment after (and in an embodiment immediately after) any (instructions for) expressions (operations) that will produce common results for all the threads (work items) in the set of threads (work items).

Correspondingly, the compiler in an embodiment places any (instructions for) program expressions (operations) that are (definitely) required to be executed for each thread (work item) individually (i.e. that potentially will produce a different result for each individual thread (work item)) towards the end of the program execution (and at least after some, and in an embodiment after all, of the (instructions for) program expressions (operations) that will produce common results for plural threads (work items)).

In an embodiment, the compiler operates to place any program instructions that execute expressions which need to be executed for each work item individually, and which are dependent upon the results of earlier instructions that execute common expressions in the program, after the instructions that execute common expressions in the program (or at least after the instructions that execute common expressions in the program that those instructions are dependent upon). This could comprise, e.g., simply placing the instructions after all the instructions in the program that execute common expressions, or the arrangement could be such that the instructions are at least placed after the instructions that execute the common expressions that those instructions are dependent upon.

Correspondingly, in an embodiment, where the program includes instructions that execute expressions which need to be executed for each work item individually, but which are not dependent upon the results of earlier instructions that execute common expressions in the program, then those instructions which are not dependent upon the results of earlier instructions that execute common expressions in the program are in an embodiment arranged to occur in the sequence of instructions for the program after the instructions that execute the common expressions, but before any "per-work item" instructions that are dependent upon the common expressions.

Correspondingly, any (or the) start point in the program that is after the common expression instruction execution is in an embodiment set to be at the beginning of any, e.g., per-work item, instructions that do not depend upon the common expressions. This can then allow, for example, execution threads that are to start at that later point in the program execution sequence to start executing instructions before the instructions that perform the common expressions have been completed.

Correspondingly, the compiler in an embodiment operates to include (place) the "set-entry" instruction in the manner of the technology described herein at the appropriate point in the instruction sequence for the program in question. Thus, the compiler in an embodiment operates to include the "set-entry" instruction in the instruction sequence between the instructions that it is desired to omit (skip) once the set-entry instruction has been executed, and those instructions that should still be executed after the set-entry instruction has been executed (i.e. before the new start point in the program execution that will be set by executing the set-entry instruction). Thus, in an embodiment, the compiler will include a set-entry instruction in the sequence of instructions for a program before the instruction which the set-entry instruction sets as the new start instruction for threads executing the program, and in an embodiment immediately before that "new" start instruction in the sequence of instructions for the program.

Thus, the compiler in an embodiment operates to place the set-entry instruction in the sequence of instructions for a program after any program expressions (operations) that will produce a common (the same) result for all the threads (work items) of a set of threads (work items) that the program is to be executed for, and before any (instructions for) program expressions (operations) that are (definitely) required to be executed for each thread (work item) individually (i.e. that potentially will produce a different result for each individual thread (work item), and in an embodiment in between those two sequences of instructions.

The technology described herein also extends to the compiler itself.

Thus, another embodiment of the technology described herein comprises a compiler that compiles programs to generate instructions for execution by a programmable execution unit of a graphics processor operable to execute programs for execution threads to perform processing operations;

wherein the compiler is configured to, for a program to be executed by the execution unit of the graphics processor, the program comprising a sequence of instructions to be executed, and having associated with it a start instruction indication, indicating the instruction in the sequence of instructions for the program at which execution of the program should be started by an execution thread:

include in the program to be executed by the programmable execution unit of the graphics processor, a "set-entry" instruction, which, when executed by a thread, will cause the start instruction indication associated with the program to be modified to indicate a different instruction in the sequence of instructions for the program at which execution of the program should be started by an execution thread.

Another embodiment of the technology described herein comprises a method of compiling a program to generate instructions for execution by a programmable execution unit of a graphics processor operable to execute programs for execution threads to perform processing operations, the method comprising:

including in a program to be executed by the execution unit of the graphics processor, the program comprising a sequence of instructions to be executed, and having associated with it a start instruction indication, indicating the instruction in the sequence of instructions for the program at which execution of the program should be started by an execution thread:

a "set-entry" instruction, which, when executed by a thread, will cause the start instruction indication associated with the program to be modified to indicate a different instruction in the sequence of instructions for the program at which execution of the program should be started by an execution thread.

As will be appreciated by those skilled in the art, these embodiments of the technology described herein can and in an embodiment do include any one or more or all of the features of the technology described herein described herein, as appropriate.

Thus, for example the compiler in an embodiment also identifies and operates to place the instructions for any program expressions that will produce the same result for a plurality, e.g. all, of the work items of a set of work items that the program is to be executed for in the execution order of the program before instructions for program expressions that are required to be executed for each work item individually, and in an embodiment after (and in an embodiment immediately after) any instructions for expressions that will produce common results for all the work items in the set of work items.

Correspondingly, the compiler in an embodiment operates to place the set-entry instruction between instructions for any program expressions that will produce the same result for a plurality, e.g. all, of the work items of a set of work items that the program is to be executed for in the execution order of the program and instructions for program expressions that are required to be executed for each work item individually, and in an embodiment after (and in an embodiment immediately after) any instructions for expressions that will produce common results for all the work items in the set of work items.

The compiler may, e.g., and in an embodiment does, run on a host processor of the overall data processing system that includes the graphics processor (such that the compiler and compiled code run on separate processors within the overall data graphics processing system)). However, other arrangements would be possible, such as the compiler running on the same processor as the compiled code, or the compiler being run on a (completely) separate processor, such as the program being precompiled on a separate system and being distributed in a compiled form. The compiler in an embodiment runs as part of the driver (the driver operation) for the graphics processor. (Thus the processing circuit that associates a program to be executed with a start instruction indication and includes the set-entry instruction in the program in an embodiment comprises a compiler circuit and/or a driver circuit for the graphics processor (e.g., and in an embodiment, that is provided on a host processor of the overall data processing system that includes the graphics processor).)

The operation in the manner of the technology described herein to identify and provide plural thread execution start points in a program to be executed can be (and in one embodiment is) considered for each and every program that is to be executed by the graphics processor. It would also be possible to try to identify and provide plural thread execution start points only for particular categories or types of programs but not for other categories or types of programs (e.g. where the type of program is unlikely to offer useful plural thread execution start points).

It is not necessary that each and every program has to have plural thread execution start points included in it, for example where the compiler determines that suitable plural thread execution start points do not exist or may not be so useful in the program in question.

As will be appreciated from the above, in operation of the technology described herein, a set of execution threads are issued to the execution unit to execute the program that includes the "set-entry" instruction.

Until (before) a thread of the set of execution threads has executed the set-entry instruction, then any thread that is executing the program will, when it is to execute the program, determine from the start instruction indication provided for the program, the "initial" start instruction for the program (e.g., and in an embodiment, and as discussed above, the first instruction in the instruction sequence for the program) as being the instruction in the program at which it should start its execution of the program, and, accordingly, will start its execution of the program at that initial start instruction (e.g., and in an embodiment, from the beginning of the program).

Execution threads will then continue to begin their execution of the program at the initial start point, until an execution thread executes the "set-entry" instruction to change the start instruction for the program. Any execution threads that start their execution of the program after the set-entry instruction has been executed by a thread in the set of threads will, accordingly, then determine the new, different start instruction from the modified start instruction indication, and therefore start their execution of the program at the new, different start instruction.

The technology described herein also extends to the operation of the programmable execution unit in response to a set-entry instruction.

Thus, another embodiment of the technology described herein comprises a method of operating a graphics processor comprising a programmable execution unit operable to execute programs for execution threads to perform processing operations;

the method comprising, when the programmable execution unit is executing a program for a set of plural execution threads, the program comprising: a sequence of instructions to be executed; and having associated with it a start instruction indication, indicating the instruction in the sequence of instructions for the program at which execution of the program should be started by an execution thread; and including a "set-entry" instruction, which, when executed by a thread, will cause the start instruction indication to be modified to indicate a different instruction in the sequence of instructions for the program at which execution of the program should be started by an execution thread:

for each execution thread executing the program, determining from the start instruction indication associated with the program, the instruction in the sequence of instructions for the program at which the thread should start execution of the program, and starting execution of the program for the thread at the indicated instruction; and an execution thread, when executing the program, in response to the "set-entry" instruction:

causing the start instruction indication to indicate a different instruction in the sequence of instructions for the program at which to start execution of the program, such that execution threads that start their execution of the program thereafter will start their execution of the program at the indicated different instruction in the instruction sequence.

Another embodiment of the technology described herein comprises a graphics processor comprising:

a programmable execution unit operable to execute programs for execution threads to perform processing operations; and an execution thread issuing circuit configured to issue execution threads to the programmable execution unit;

wherein the programmable execution unit of the graphics processor is configured to, when executing a program for an execution thread, the program comprising: a sequence of instructions to be executed; and having associated with it a start instruction indication, indicating the instruction in the sequence of instructions for the program at which execution of the program should be started by an execution thread; and including a "set-entry" instruction, which, when executed by a thread, will cause the start instruction indication associated with the program to be modified to indicate a different instruction in the sequence of instructions for the program at which execution of the program should be started by an execution thread:

determine from the start instruction indication associated with the program, the instruction in the sequence of instructions for the program at which the thread should start execution of the program, and start execution of the program for the execution thread at the indicated instruction;

and when an execution thread, when executing the program, executes the "set-entry" instruction:

cause the start instruction indication to indicate a different instruction in the sequence of instructions for the program at which to start execution of the program, such that execution threads that start their execution of the program thereafter will start their execution of the program at the indicated different instruction in the instruction sequence.

As will be appreciated by those skilled in the art, these embodiments of the technology described herein can and in an embodiment do include any one or more or all of the features of the technology described herein described herein, as appropriate.

In an embodiment, a single thread is initially issued to execute the program starting at the initial start point (e.g. the beginning of the program), with no other threads in the set of threads that are to execute the program then starting their execution of the program (e.g. by being stalled or not issued) until the first thread has executed the set-entry instruction, with the later threads then starting (e.g. being issued or released) to execute the program once (and only once) the first thread has executed the set-entry instruction. This will then have the effect that only one thread will execute the set of instructions of the program (e.g., and in an embodiment the common expressions in the program) that the set-entry instruction then omits (skips), with all later threads then only executing the, effectively, reduced program starting from the new start point that is triggered by the set-entry instruction.

In order to facilitate this operation, it is in an embodiment tracked whether a thread has executed the set-entry instruction or not, such that it can be identified when a thread has executed the set-entry instruction such that, for example, any threads waiting for that event can then be released (or issued) for execution.

The completion of the set-entry instruction in the program by a thread can be tracked and indicated in any appropriate and desired manner. For example, and in an embodiment, an appropriate flag could be used to indicate this, with the flag being, e.g. cleared once a thread has executed the set-entry instruction to thereby indicate that the set-entry instruction has been executed. In this case, a "set-entry" flag could be associated with the program, e.g. in appropriate state data for the program, which flag is set, e.g. by the compiler, to indicate that a set-entry instruction is present in the program, with the flag then being appropriately cleared when the set-entry instruction is executed by a thread.

In an embodiment, there is a thread scheduler that monitors the execution of the set-entry instruction of the program by threads, and that releases/issues threads that are to start at the later point in the program for execution when it observes that the relevant earlier set-entry instruction dependency for the thread or threads in question has been met.

In an embodiment, the execution of thread(s) that are executing the instructions before a set-entry instruction in the program (and the execution of those instructions before the set-entry instruction) are prioritised as the program is being executed, so as to try to produce the results of those instructions as early as possible during the execution of the program for the set of threads in question. This will then help to ensure that any dependencies on the instructions prior to the set-entry instruction within the program can be met (e.g. the required results provided) earlier, and in an embodiment as early as possible, in execution of the program for the set of threads in question. The, e.g. thread scheduler, may be, e.g., and is in an embodiment, configured to prioritise execution and completion of the instructions prior to the set-entry instruction(s) in the program so as to achieve this. For example, in an embodiment the first thread that is executing the program is prioritised above the execution of (any) other threads that are executing the program.

While in an embodiment, as discussed above, the execution of subsequent threads is delayed until a first thread has executed the set-entry instruction, it would be possible simply to start issuing execution threads in the set of execution threads to the execution unit to execute the program continuously, until one of those threads executes the set-entry instruction, with threads issued thereafter then having the new, different start point for execution of the program (and in another embodiment, this is what is done). This may be desirable in the case where, for example, there are no other sets of threads able to be issued to the execution circuit of the graphics processor whilst the threads of the set of execution threads in question are waiting for the set-entry instruction to be executed, so as to avoid, for example, causing any "bubbles" in the execution unit pipeline.

This will be acceptable, because it should in any event be safe for any threads to execute the program from the initial start (entry) point (e.g. from the beginning of the program), irrespective of the presence of and execution or otherwise of the "set-entry" instruction.

Any thread that executes the set-entry instruction should, and in an embodiment does, simply continue its execution of the program thereafter, so as to execute the program to completion. Threads that start their execution of the program after the set-entry instruction has been executed by a thread will correspondingly start execution of the program at the new, start (entry) point set by the execution of the set-entry instruction, and then execute the program to completion from that point.

Although the technology described herein has primarily been described above with reference to a program containing one set-entry instruction (and in one embodiment, the program does contain only a single set-entry instruction), it would be possible for a program to be provided with and to include plural set-entry instructions, if desired (and in one embodiment, this is done).

The Applicants have recognised in this regard that there may be circumstances where it is desirable to sub-divide a program into more than two parts, e.g. with each such part comprising a respective subset of the instructions for the program, e.g. being respectively configured to execute different "tasks" (sequences of instructions) within the overall program to be executed, with execution threads then being triggered to execute some or all of the different parts of the program through the inclusion and use of appropriate set-entry instructions.

This would then allow a finer sub-division of the instructions executed by (and thus operations performed by) respective threads executing the program to be provided.

In this case, each desired sub-division of the sequence of instructions for the program is in an embodiment configured and triggered by the inclusion of an appropriate set-entry instruction, with execution threads then progressively executing the set-entry instructions in the instruction sequence for the program, such that later threads will then execute, e.g., and in an embodiment, progressively smaller parts of the program (and correspondingly progressively omit (skip) more and more earlier parts of the program).

Thus, in an embodiment, a program to be executed is provided with and includes two or more set-entry instructions in the manner of the technology described herein, with each different set-entry instruction changing the start instruction indication to indicate a different instruction in the program at which threads should start their execution of the program.

In this case therefore there will, for example, and in an embodiment, be a first sub-sequence of instructions for the program followed by a first set-entry instruction, followed by a second sub-sequence of instructions for the program followed by a second set-entry instruction, followed by a third sub-sequence of instructions for the program (and so on, if desired).

Then, when executing the program, threads will initially start at the beginning of the program (and so execute the first, second and third sub-sequences of instructions in the program), but when a thread reaches and executes the first set-entry instruction, the start instruction indication for the program will be changed to indicate the start instruction for that first set-entry instruction such that, e.g., and in an embodiment, threads executing thereafter will omit the first sub-sequence of instructions and start their execution at the beginning of the second sub-sequence of instructions (and then execute the third sub-sequence of instructions).

This will then continue until a thread reaches and executes the second set-entry instruction in the program, at which point the start instruction indication will be changed to indicate the start instruction for that second set-entry instruction, such as, and in an embodiment, at the beginning of the third sub-sequence of instructions. Threads that start their execution of the program thereafter will accordingly omit the first and second sub-sequence of instructions and start their execution of the program at the start of the third sub-sequence of instructions (and so on, if there are more set-entry instructions in the program).

In this way, different threads can be configured to omit (skip) execution of (different) sub-sequences of instructions in the program.

In this case, the operation in respect of each particular set-entry instruction in the program is in an embodiment configured and in accordance with the operation of the set-entry instruction as discussed above. Thus each set-entry instruction will, when executed, in an embodiment modify a local copy of the start instruction indication to indicate a new, different (and in an embodiment later) start instruction for subsequent execution threads. (Correspondingly, each different set-entry instruction will modify the (same) start instruction indication for the program to indicate a different start instruction when executed. Thus there will be a single set-entry instruction indication that will be progressively modified as the different set-entry instructions in the program are executed.)

Correspondingly, the execution of the different set-entry instructions by threads in a set of threads that are executing the program is in an embodiment tracked so as to determine when a (and each) set-entry instruction has been executed by a thread (so as to, e.g., and in an embodiment, then release/issue for execution threads that are waiting for that event).

Again, this is in an embodiment done by providing appropriate flags that can be used to indicate the execution of a set-entry instruction. In this case, there would, e.g., and in an embodiment, be an appropriate flag for each different set-entry instruction, with that flag then being reset when the corresponding set-entry instruction is executed by a thread. Each such flag could, e.g., have an appropriate index to identify the flag in question, with that flag index then being correspondingly indicated (e.g. encoded) in the set-entry instruction that it relates to (so as to allow the flag to be reset when the set-entry instruction is executed to be identified).

Once all the flags are reset, then all threads may start execution of the program.

In the case where more than two set-entry instructions are included in a program (i.e. there are more than two start (entry) points for execution threads in the program), then the plural start (entry) points for execution threads that are provided in the program can be selected as desired.

In an embodiment, one of the entry points is the start of the program (i.e. at the first instruction in the sequence of instructions for the program, and from which a thread may be correctly executed to completion, without, for example, relying on data output by any other thread).

There is in an embodiment then a start (entry) point that is after a first subset of instructions that execute common expressions for the program as a whole (i.e. that relate to (that will produce the same result for) all the threads (work items) (that are common to all the threads) in a set of plural threads to be executed, but before a second subset of instructions that execute common expressions that relate to (that will produce the same result for) only subsets of threads (work items) within an overall set of threads (work items) to be executed.

(The latter may be the case, for example, where execution threads for a shader program can be grouped into respective work groups, such as could be the case for compute shaders, such as OpenCL and DirectCompute. In this case, there may be a set of expressions that will produce the same result for each thread (work item) in a work group, but which could or will produce different results for different work groups.)

There is in an embodiment then a start (entry) point that is after both a first subset of instructions that execute common expressions for the program as a whole (i.e. that relate to (that will produce the same result for) all the threads (work items) (that are common to all the threads) in a set of plural threads to be executed and a second subset of instructions that execute common expressions that relate to (that will produce the same result for) only subsets of threads (work items) within an overall set of threads (work items) to be executed.

Thus, in an embodiment, it is possible for execution threads to start execution of the shader program after instructions that execute expressions in the shader program that will be "common" for a subset or subsets of a set of execution threads (work items) that the shader program is being executed for, as well as after sets of instructions in the shader program that execute expressions that are common for all the threads (work items) in a set of threads (work items) that the shader program is being executed for.

Correspondingly, in an embodiment, there are three start points in the shader program for execution threads, one at the beginning of the shader program, one after a first set of instructions that execute common expressions in the shader program as a whole, and a third start point after a second set of instructions that execute common expressions for respective work groups.

As will be appreciated from the above, in operation of the technology described herein, at least in its embodiments, at least one thread will execute the complete program, but other threads will omit (not execute) instructions in the program, such as instructions that perform common expressions in the program prior to the new start point for the program that is set by execution of the set-entry instruction.

This being the case, in an embodiment the results (data value(s)) that are generated by execution of the instructions in the program prior to a (and the) new, "set-entry" entry point (e.g., and in an embodiment, that are generated by the common expressions in the program) are made available for use to other threads that are executing the program (and in particular to other threads that start the program at a different, later point and thus do not themselves execute the instructions prior to the new, "set-entry" entry point (e.g. for the common expressions in question)).

These, earlier, e.g. common, expression results (data values) can be provided for use for other execution threads in any suitable and desired manner. In an embodiment the results are stored so as to be accessible to other execution threads that are executing the program.

The earlier, e.g. common, expression, results (data values) could be stored in any suitable storage that is accessible to the graphics processing pipeline. Thus they could, for example, be stored appropriately in memory, with load operations (instructions) to load those values from memory for threads then being used to load those values when they are required for other threads and later expressions in the program. However, in an embodiment, the results (data values) that are generated by the earlier, e.g. common, expressions in the program are stored in appropriate local storage of the graphics processor, such as a cache, and in an embodiment in registers of the graphics processor. The data values are in an embodiment stored in appropriate local storage, e.g. and in an embodiment registers, that are shared by all the threads that are executing the program, so that those values are available for use by other threads for later parts of the program without the need to load them from other memory.

Although the technology described herein has been described above with reference to execution of threads and threads executing the program (and the set-entry instruction), etc., it will be appreciated that in the case where the execution unit is operable to execute threads as respective thread groups (warps) of plural threads together, then the operation in the manner of the technology described herein should be performed for respective thread groups ("warps") accordingly.

((Shader) program execution efficiency may be improved by grouping execution threads (where each thread corresponds to one work item) into "groups" or "bundles" of threads, where the threads of one group are run in lockstep, e.g. one instruction at a time. In this way, it is possible to share instruction fetch and scheduling resources between all the threads in the group. Other terms used for such thread groups include "warps" and "wavefronts". For convenience, the term "thread group" will be used herein, but this is intended to encompass all equivalent terms and arrangements, unless otherwise indicated.)

Thus, in this case, the program will be executed by respective groups of plural threads (and respective thread groups will be issued to the programmable execution unit to execute the program), with each thread group that is to execute the program determining from the start instruction indication which instruction in the program to start its execution of the program at, and each individual thread in the thread group in question then starting its execution of the program at the indicated instruction.

A respective thread group will then execute the set-entry instruction to change the start instruction for later thread groups to the new, different instruction, and any later thread groups that execute the program after a thread group has executed the set-entry instruction will then start their execution of the program at the new, different start (entry) instruction.

As will be appreciated by those skilled in the art, the graphics processor (graphics processing unit) of the technology described herein will be part of an overall graphics processing system that will include, e.g., and in an embodiment, a host processor that, e.g., executes applications that require graphics processing by the graphics processor. The host processor will send appropriate commands and data to the graphics processor to control it to perform graphics processing operations and to produce graphics processing (render) output required by applications executing on the host processor. To facilitate this, the host processor should, and in an embodiment does, also execute a driver for the graphics processor and a compiler or compilers for compiling (shader) programs to be executed by the programmable execution unit of the graphics processor.

The graphics processor may also comprise, and/or be in communication with, one or more memories and/or memory devices that store the data described herein, and/or the output data generated by the graphics processor, and/or software for performing the processes described herein. The graphics processor may also be in communication with a host microprocessor, and/or with a display for displaying images based on the data generated by the graphics processor.

As well as any programmable processing (shader) stages, the graphics processing pipeline that the graphics processor executes may also contain any other suitable and desired processing stages that a graphics processing pipeline may contain such as a rasteriser, an early depth (or an early depth and stencil) tester, a late depth (or depth and stencil) tester, a blender, a tile buffer, a write out unit, etc.

The technology described herein can be used for all forms of output that a graphics processing pipeline may be used to generate, such as frames for display, render-to-texture outputs, etc. The output, e.g. fragment shaded, data values from the graphics processing are in an embodiment exported to external, e.g. main, memory, for storage and use, such as to a frame buffer for a display.

The technology described herein is applicable to any suitable form or configuration of graphics processor. It is particularly applicable to tile-based graphics processors and graphics processing systems. Thus in an embodiment, the graphics processing system and graphics processing pipeline are a tile-based system and pipeline, respectively.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuits, circuitry, processing logic, microprocessor arrangements, etc., that are operable to perform the various functions, etc., such as appropriately dedicated hardware elements (circuits) and/or programmable hardware elements (circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits, etc., if desired.

Subject to any hardware necessary to carry out the specific functions discussed above, the data processing system and pipeline can otherwise include any one or more or all of the usual functional units, circuits, etc., that data processing system and pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display.

FIG. 1 shows a typical computer graphics processing system, comprising a host processor 1, a graphics processor (GPU) 3, and a (main) memory 6.

An application 2, such as a game, executing on the host processor 1 will require graphics processing operations to be performed by the associated graphics processing unit (graphics processor) (GPU) 3 that executes a graphics processing pipeline. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" and data will be provided to the graphics processor 3 (e.g. via the memory 6) in response to commands from the application 2 running on the host system 1 for graphics output (e.g. to generate a frame to be displayed).

FIG. 2 shows the graphics processing pipeline 33 executed by the graphics processor 3 in the present embodiments in more detail.

The graphics processing pipeline 33 shown in FIG. 2 is a tile-based renderer and will thus produce tiles of a render output data array, such as an output frame to be generated.

(In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may typically be an output frame intended for display on a display device, such as a screen or printer, but may also, for example, comprise intermediate data intended for use in later rendering passes (also known as a "render to texture" output), etc.

(When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.)

FIG. 2 shows the main elements and pipeline stages of the graphics processing pipeline 33 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuits (processing logic), such as programmable or fixed-function circuits, etc., for performing the necessary operations and functions.

As shown in FIG. 2, the graphics processing pipeline 33 includes a number of stages, including vertex shader 20, a hull shader 21, a tesselator 22, a domain shader 23, a geometry shader 24, a rasteriser 25, an early Z (depth) and stencil test 26, a renderer in the form of a fragment shader stage 27, a late Z (depth) and stencil test 28, a blender 29, a tile buffer 30 and a downsampling and writeout (multisample resolve) stage 31.

The vertex shader 20 takes the input data values associated with the vertices, etc., defined for the output to be generated, and processes those data values to generate a set of corresponding "vertex shaded" output data values for use by subsequent stages of the graphics processing pipeline 33. The vertex shading, for example, modifies the input data to take account of the effect of lighting in the image to be rendered.

The hull shader 21 performs operations on sets of patch control points and generates additional data known as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 33.

The rasteriser 25 of the graphics processing pipeline 33 operates to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil test 26 performs a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test 26 are then sent to the fragment shading stage 27. The fragment shading stage 27 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 27 is in the form of a shader pipeline (a programmable fragment shader).

There is then a "late" fragment Z and stencil test 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by comparing the depth values of (associated with) fragments issuing from the fragment shading stage 27 with the depth values of fragments that have already been rendered (as stored in the depth buffer). This late fragment depth and stencil test 28 also carries out any necessary "late" alpha and/or stencil tests on the fragments.

The fragments that pass the late fragment test 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z-buffer within the tile buffer 30. (The tile buffer stores colour and depth buffers that store an appropriate colour, etc., or Z-value, respectively, for each sampling point that the buffers represent (in essence for each sampling point of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4x multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). (The display device could comprise, e.g., a display comprising an array of pixels, such as a computer monitor or a printer.)

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 33 would, of course, be possible.

The above describes certain features of the operation of the graphics processing system shown in FIG. 1. Further features of the operation of the graphics processing system shown in FIG. 1 in accordance with embodiments of the technology described herein will now be described.

As can be seen from FIG. 2, the graphics processing pipeline 33 includes a number of programmable processing or "shader" stages, namely the vertex shader 20, hull shader 21, domain shader 23, geometry shader 24, and the fragment shader 27. These programmable shader stages execute respective shader programs that have one or more input variables and generate sets of output variables and that are provided by the application.

To do this, the application 2 provides the shader programs implemented using a high-level shader programming language, such as GLSL, HLSL, OpenCL, etc. These shader programs are then translated by a shader language compiler 5 to binary code for the target graphics processing pipeline 33. This may include the creation of one or more intermediate representations of the program within the compiler. (The compiler 5 may, e.g., be part of the driver 4, with there being a special API call to cause the compiler to run. The compiler execution can thus be seen as being part of the draw call preparation done by the driver in response to API calls generated by an application).

FIG. 2 shows schematically the operation stages of the graphics processing pipeline 33 that is executed by the graphics processing unit 3.

FIG. 3 shows the corresponding functional units of the graphics processing unit (processor) 3 that are used to perform (and thus to act as) various ones of the processing operations and stages of the graphics processing pipeline 33 shown in FIG. 2. (There may be other functional units in the graphics processing unit 3. FIG. 3 shows those functional units that are relevant to operation in the manner of the technology described herein only for simplicity.)

As shown in FIG. 3, the graphics processing unit 3 includes a rasteriser 40, a thread spawner 41, a programmable execution unit (circuit) 42, a varying interpolator 43, a texture mapper 44, a blender 45, and a set of registers 46.

The thread spawner 41 is operable to spawn execution threads and groups of execution threads (warps) for execution by the programmable execution unit 42, e.g. for fragments that it receives from the rasteriser 40.

The programmable execution unit 42 operates to execute shader programs to perform the shader operations of the graphics processing pipeline, such as the hull shader, the vertex shader and the fragment shader. To do this, it receives (groups of) execution threads from the thread spawner 41 and executes the relevant shader program for those execution threads. As part of this operation, and as shown in FIG. 3, the execution threads will read data from and write data to respective registers 46.

As part of this processing, and as shown in FIG. 3, the programmable execution unit 42 can call upon the varying interpolator 43, the texture mapper 44 and the blender 45 to perform specific graphics processing operations. To do this, the programmable execution unit will send appropriate messages to the relevant accelerator (and receive the appropriate response therefrom), e.g. in response to specific instructions in a shader program that it is executing.

The varying interpolator 43 operates to interpolate values across graphics primitives, and, as part of this operation, often creates texture coordinates to be used for sampling graphics textures.

The texture mapper 44 operates to sample graphics textures using texture coordinates, e.g. generated by the varying interpolator 43, and produces therefrom a filtered texture sample result (which it can then return to the programmable execution unit 42 for use, e.g. when shading sampling points).

The blender 45 operates to blend, e.g., fragment shading results generated by the programmable execution unit 42 with previously generated fragment shader results, such as results that are already stored in the tile buffer and/or the frame buffer.

As discussed above, the programmable execution unit 42 executes shader programs to be executed for execution threads and groups (warps) of execution threads that it receives from the thread spawner 41 to perform graphics processing operations.

A number of embodiments for the execution of shader programs by execution threads in the programmable execution unit 42 will now be described with reference to FIGS. 4 to 9.

In these embodiments, threads can begin their execution of a shader program at different start (entry) points within a shader program, and the change of start (entry) point for a shader program is triggered by the execution of a set-entry instruction that is included in the shader program.

Figure 4:
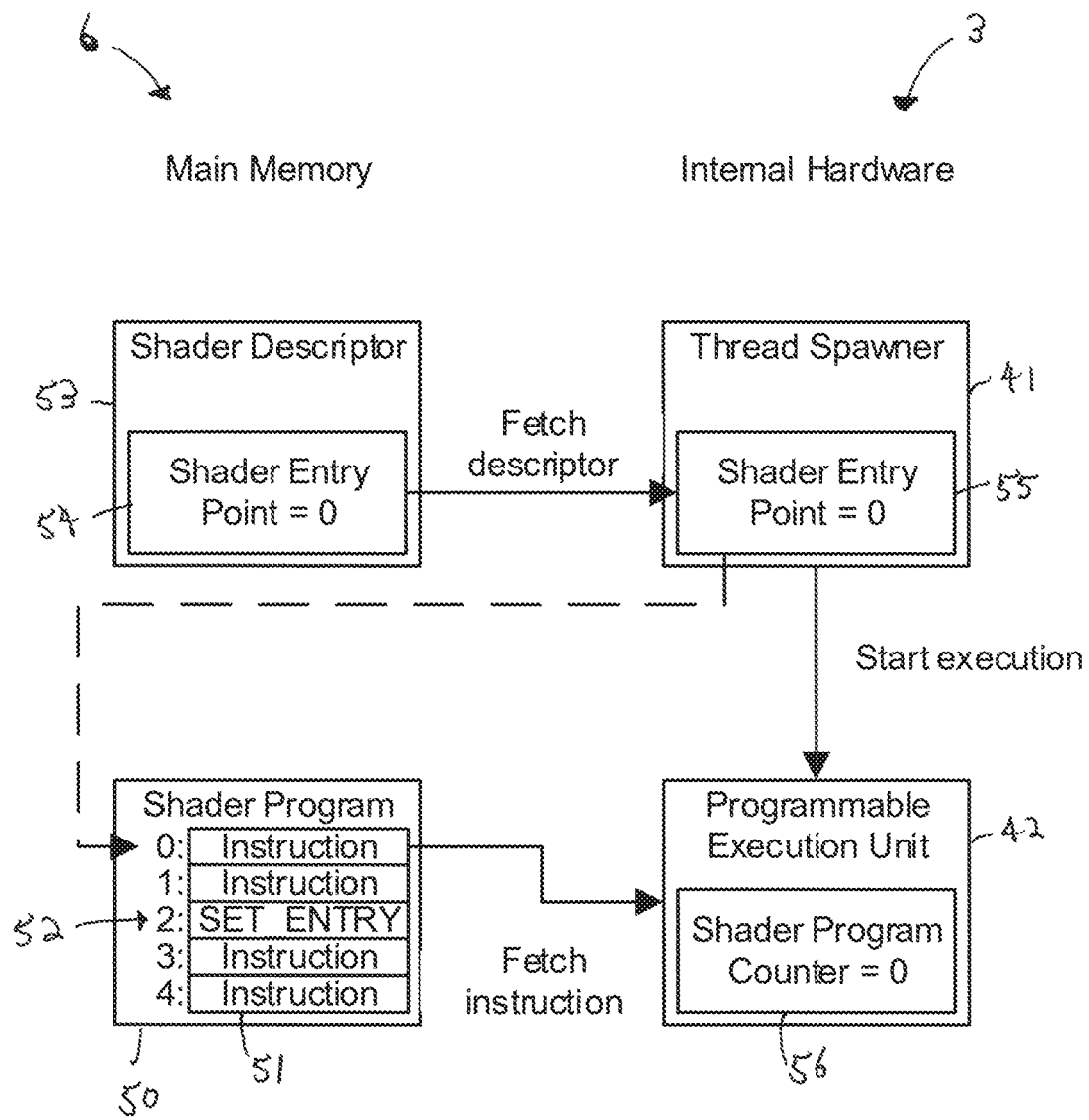
FIGS. 4, 5 and 6 show the execution of a shader program in an embodiment of the technology described herein.
Figure 5:
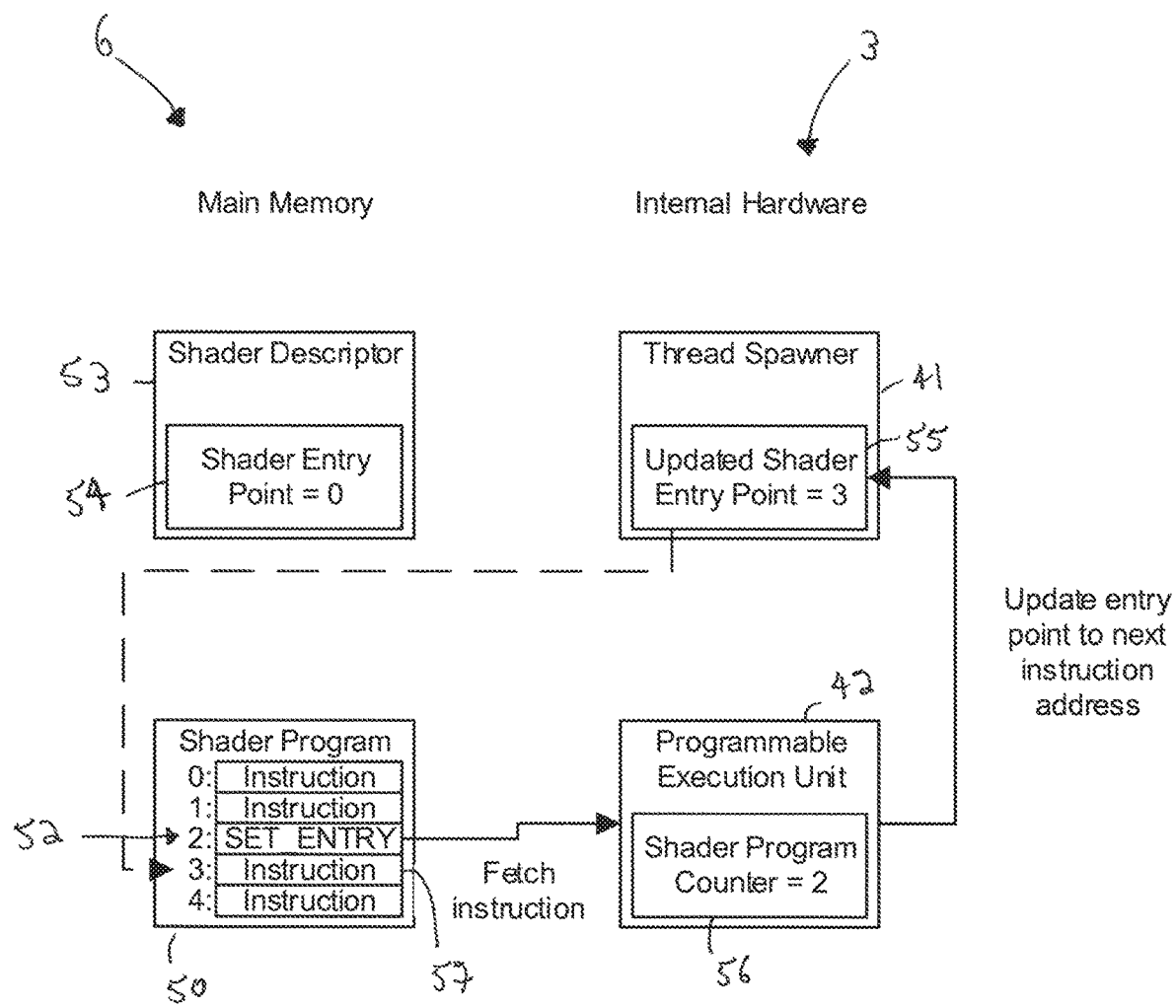
Figure 6:
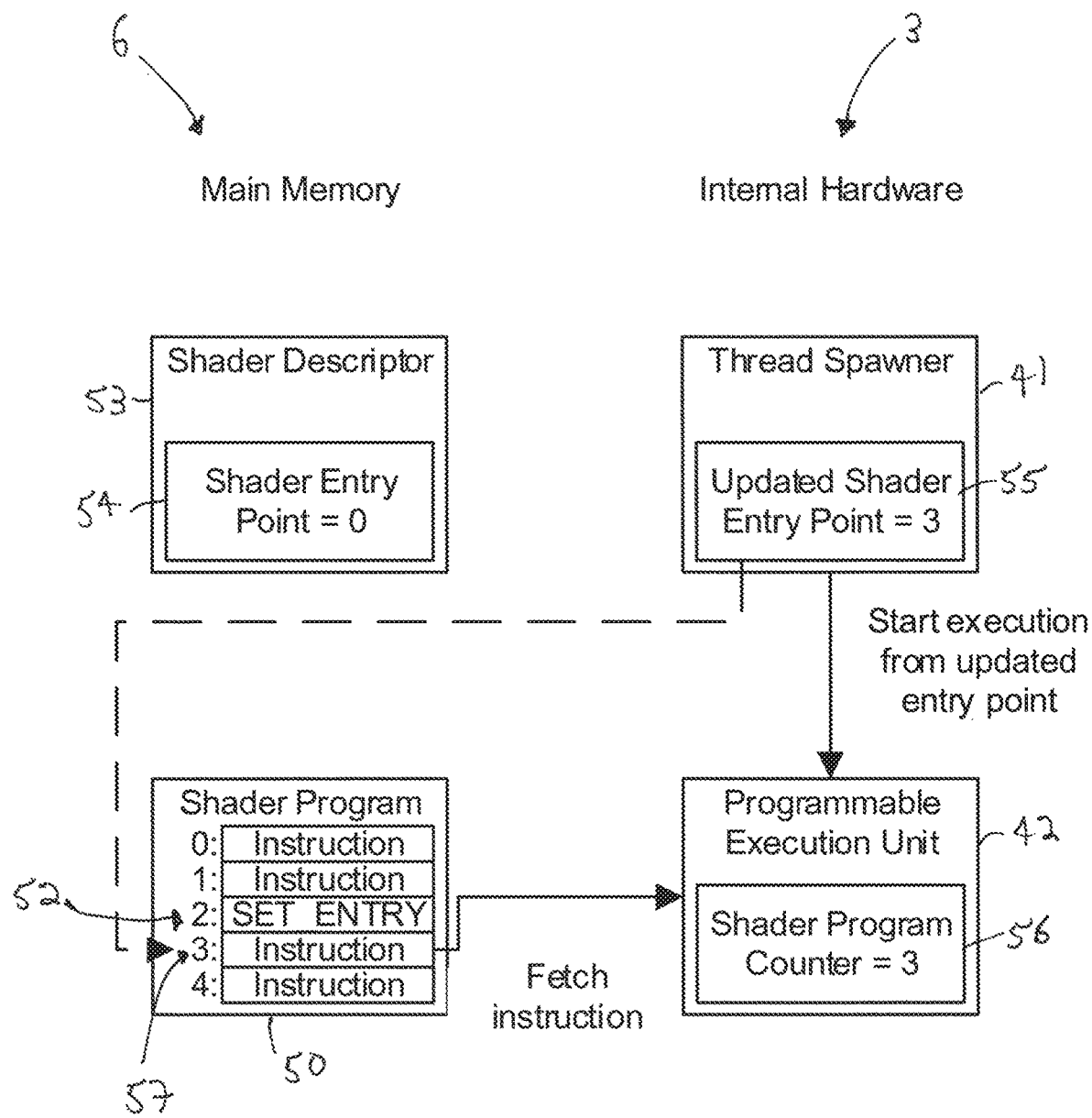

FIGS. 4-6 show this operation in an embodiment of the technology described herein.

As shown in FIG. 4, a shader program 50 to be executed will include an appropriate sequence of instructions 51 (in this example five instructions), with one of the instructions in the sequence of instructions 51 for the shader program 50 comprising a "set-entry" instruction 52 in accordance with the technology described herein.

The shader program 50 for execution by the programmable execution unit 42 of the graphics processor 3 will be prepared and generated by the compiler 5 for the graphics processor, e.g., and in an embodiment, based on a higher level shader program (expressions) provided by an application 2 that requires graphics processing. The shader program 50 may be stored, e.g., in the main memory 6, and accessed therefrom by the graphics processor 3 (and in particular by the programmable execution unit 42) when it is to be executed by execution threads.

As shown in FIG. 4, as well as the shader program including the set-entry instruction 52, the driver also generates an appropriate set of state data for the shader program 50, in the form of a shader descriptor 53. The shader descriptor 53 includes in particular, as shown in FIG. 4, a start instruction indication 54, which indicates the instruction at which a thread should start its execution of the shader program (the "shader entry point").

As shown in FIG. 4, when the shader descriptor 53 is initially generated for the shader program, the start instruction indication (shader entry point) 54 is set to the first instruction in the shader program (so a program count of 0). The shader descriptor 53, including the start instruction indication 54, is again stored in the main memory 6 for access by the graphics processor 3.

Then, when the shader program is to be executed by the graphics processor 3, as shown in FIG. 4, the thread spawner 41 of the graphics processor 3 will fetch and store a local copy 55 of the shader descriptor 53, including the start instruction indication 54. It will then issue threads to the programmable execution unit to execute the shader program.

As shown in FIG. 4, when execution of the program is started (for the first thread or threads that is to execute the shader program), that all those threads will start their execution of the shader program at the shader entry point indicated by the start instruction indication 54, and so at the first instruction (program count 0) in the shader program.

Thus at this stage, the initial shader program counter 56 for each thread that is to execute the program will be set to instruction "0" as indicated by the local copy 55 of the start instruction indication.

The execution thread(s) that is executing the shader program will then execute the instructions in the shader program in turn in the normal manner, but when a thread reaches and executes the set-entry instruction 52 in the shader program, it will modify the local copy 55 of the start instruction indication to indicate a new start instruction (shader entry point).

This is illustrated in FIG. 5, which shows that when the programmable execution unit 42 executes the set-entry instruction 52 for a thread, the local copy 55 of the start instruction indication is updated to indicate a new start instruction (entry point) for the shader program. In this example, the start instruction indication 55 is updated to indicate the next instruction 57 in the instruction sequence after the set-entry instruction 52 (as shown in FIG. 5), but other arrangements would be possible, such as the set-entry instruction 52 explicitly indicating the new entry point (program counter value) that the local copy of the start instruction indication 55 should be set to (changed to).

As can be seen from FIG. 5, execution of the set-entry instruction 52 only updates the local copy 55 of the start instruction indication. The original start instruction indication 54 for the shader program 50 is not changed, so that that start instruction indication will indicate the correct entry point should the shader program 50 fall to be executed for a new set of execution threads.

Threads that start their execution of the shader program 50 after a thread has executed the set-entry instruction 52 (and thereby updated the local copy 55 of the start instruction indication), will accordingly start their execution of the shader program from the updated shader entry point.

FIG. 6 illustrates this, and shows a later thread starting its execution of the shader program 50 after the local copy 55 of the start instruction indication has been updated at the new shader entry point, namely the instruction 57 after the set-entry instruction 52. Subsequent threads starting their execution of the shader program will accordingly all start their execution of the shader program 50 at the new start instruction 57.

The effect of this then is that the inclusion of the set-entry instruction 52 in the shader program 50 can be used to trigger a change of entry point for later execution threads executing the shader program, thereby, for example, allowing those instruction threads to omit (skip) the earlier instructions in the shader program that are before the set-entry instruction.

The Applicants have recognised in this regard that many shader programs may contain expressions that will produce the same result for plural threads that execute the shader program as well as expressions that will need to be executed independently for each thread that executes the shader program.

FIG. 7 shows an example of this in a shader program. FIG. 7 shows an exemplary fragment shader program 70, which can be divided into two distinct workloads, a set of expressions 71 in the fragment shader program 70 that will produce the same results for each execution thread (and thus can be thought of as a "thread-common" workload 51), and a set of expressions 72 that need to be executed independently for each fragment, and thus can be considered to be a "per fragment" workload 72.

Thus, as shown in FIG. 7, the compiler can compile the shader program 70 into two distinct workloads, a "common expression" workload 71 and a "per fragment" workload 72 (with a temporary uniform value ("uniform temp") being used to store the result(s) of the common expression workload 71 for use for each fragment when the relevant per fragment workload expressions 72 are executed).

Furthermore, the compiler can insert a set-entry instruction in the manner of the technology described herein between the "common expression" workload 71 and the "per fragment" workload 72 sets of instructions in the shader program, to thereby, as illustrated in FIGS. 4-6, cause threads executing the shader program to initially execute both the "common expression" workload 71 and the "per fragment" workload 72, but then once a thread has executed the set-entry instruction, allow later threads to execute the per fragment expressions 72 only (and using the result(s) from the thread(s) that executed the common expressions 71).

This then helps to reduce or avoid repeated execution of the common expressions 71 for plural execution threads.

For example, when executing the so-compiled shader program, a single thread, for example, can be issued to execute both the common expressions 71 and the per fragment expressions 72, but with the other threads only executing the per fragment expressions 72 (and using the result(s) from the thread that executed the common expressions 71).

FIG. 8 illustrates this, and shows an example compiled version 80 of the shader program 70 that includes the set-entry instruction 52 after the instructions for the common workload and before the instructions for the per fragment workload.

Figure 9:
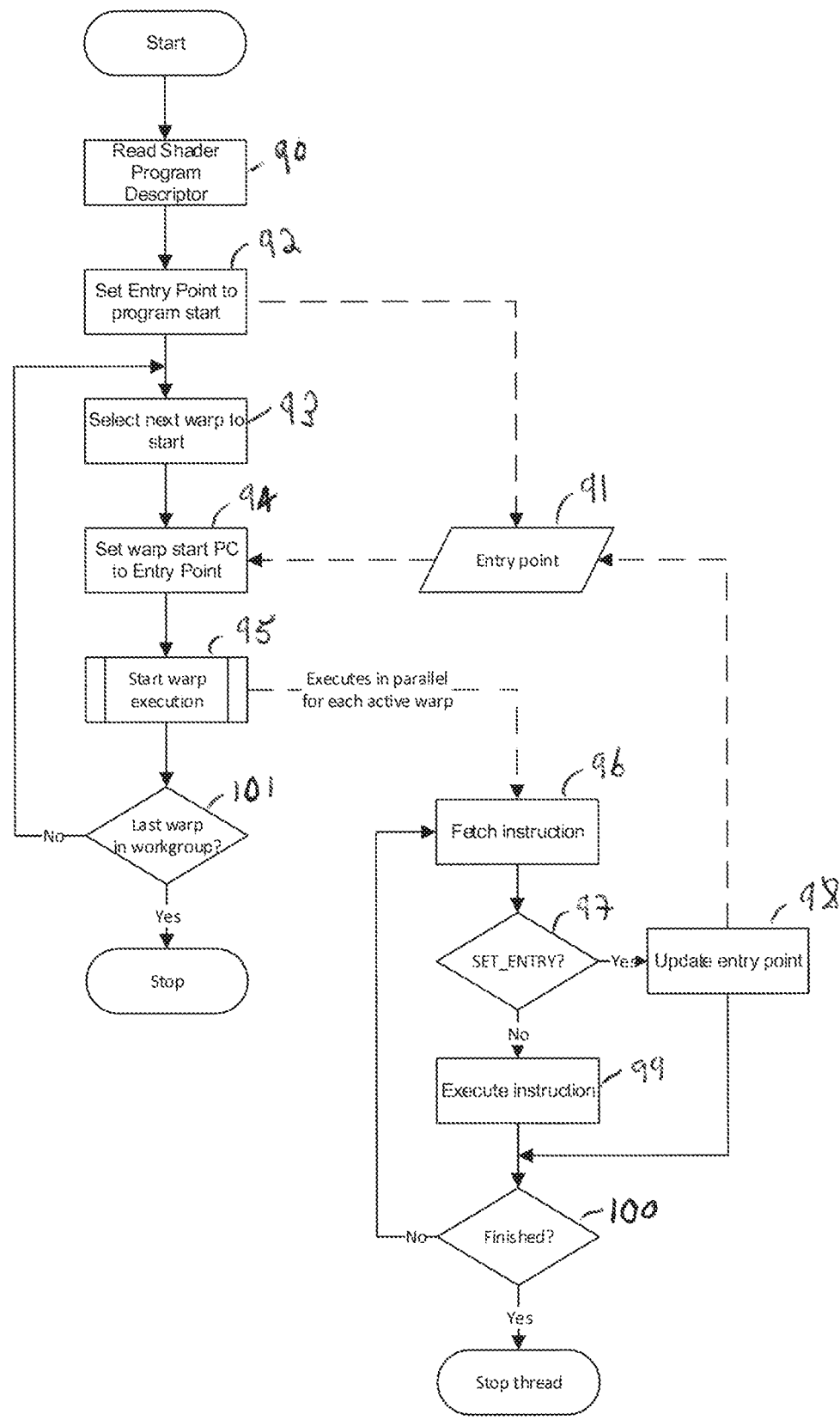
FIG. 9 shows schematically the execution of threads in an embodiment of the technology described herein.

FIG. 9 is a flowchart illustrating execution of a shader program that includes a set-entry instruction in an embodiment of the technology described herein in more detail.

In the embodiment illustrated in FIG. 9, it is assumed that respective groups (warps) of execution threads will be issued to the programmable execution unit, with the threads of a given thread group (warp) executing the shader program together, one instruction at a time. It is also assumed that respective thread groups (warps) are simply issued to execute the shader program continuously, so that, for example, more than one thread group (warp) may start execution of the program before a thread group (warp) has executed the set-entry instruction.

As shown in FIG. 9, the execution of the program starts with the thread group (warp) spawner reading the descriptor for the shader program (step 90), and then setting the local start instruction indication (entry point) 91 for the shader program to the start of the program (as that will be the initial start entry point indicated by the start instruction indication) (step 92).

The next thread group to execute the shader program will then be selected (step 93) and the shader program start (entry) point (program counter value) for that thread group (warp) will be set to the currently indicated "local" entry point 91 (step 94). As at this point the set-entry instruction has yet to be executed by a thread group, the entry point for the thread group will accordingly be set to the start of the program.

The thread group will then start its execution of the program (step 95).

As shown in FIG. 9, executing the program for respective thread groups may be performed in parallel for each active thread group (warp), and will comprise for each warp, fetching the next instruction to be executed (step 96), determining whether that instruction is the set-entry instruction (step 97), and, if so, updating the locally stored start instruction (entry point) indication 91 to the new entry point (step 98) (or otherwise executing the instruction (step 99)). This will be repeated for the thread for each instruction in the program (step 100).

Correspondingly, this operation will be performed for each thread group (warp) that is in the set of thread groups that are to execute the program (step 101).

As will be appreciated from FIG. 9, once a thread group executes the set-entry instruction at step 97 and updates the local copy of the entry point 91 at step 98, then thread groups that are selected to be executed thereafter will start at the new, updated entry point in the shader program.

In this process, any threads that execute the (common expression) instructions that are before the new entry point set by the set-entry instruction save their results to appropriate registers 46, so that those results are then available for later threads (that will not themselves execute the common instructions) when they execute the relevant instruction sequence(s). Other arrangements, such as saving the common expression results out to main memory and then reloading those results for later threads would be possible, if desired.

Figure 10:
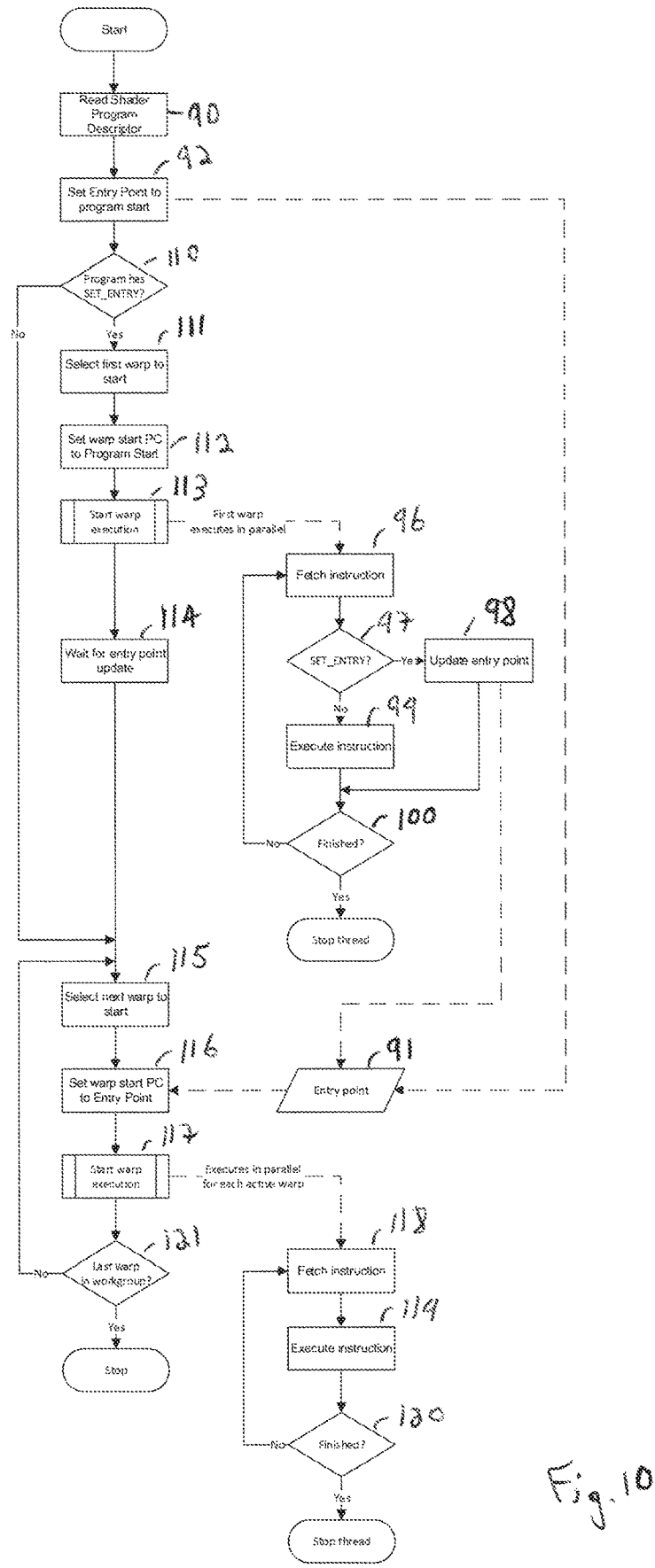
FIG. 10 shows schematically the execution of threads in an embodiment of the technology described herein.

FIG. 10 shows another embodiment of execution of a shader program. This is similar to the execution flow shown in FIG. 9, but in FIG. 10 the operation is configured such that only the first thread group to execute the shader program starts its execution of the shader program, and any other thread groups that are to execute the shader program delay their start of execution of the shader program until the first thread group has executed the set-entry instruction. This then ensures that only the single, initial thread group will execute the instructions in the shader program (e.g. the common expressions) before the set-entry instruction, with all remaining thread groups then only executing the per thread group instructions that are after the set-entry instruction in the shader program.

As shown in FIG. 10, the process again starts with reading of the shader program descriptor and setting the local entry point 91 to the program start (steps 90 and 92).

However, it is then determined whether the program includes a set-entry instruction (step 110). This may be indicated as desired, for example, and in an embodiment, by associating the program with an appropriate flag that can be set to indicate the presence of a set-entry instruction.

In the case where the program does include a set-entry instruction, then a first thread group to execute the program is selected (step 111), and that thread group starts its execution of the program at the start of the program (steps 112 and 113). Again, to execute the program, that thread group will fetch and execute instructions in turn and as part of that processing will identify the set-entry instruction in the shader program and update the local entry point 91 when it executes the set-entry instruction (steps 96-100). Thus the first thread group will execute the program through to completion, including executing the set-entry instruction.

Whilst the first thread group is executing the program, the thread group spawner tracks whether the set-entry instruction has been executed by the first thread group (step 114), and (only) when the set-entry instruction has been executed by the first thread group (so as to update the local entry point 91), does it then begin to issue other thread groups to execute the shader program. The execution of the set-entry instruction by the first thread group can be detected and indicated as desired, for example by unsetting the flag that indicated the presence of the set-entry instruction.

Once the set-entry instruction has been executed (and in the case where the program does not include a set-entry instruction), then the thread spawner will start to select further thread groups to issue for execution in turn (step 115), and those thread groups will then execute the shader program, starting at the indicated entry point in the local entry point indication 91 (steps 116 and 117). (Again, as shown in FIG. 10, execution of the shader program for a warp will comprise fetching and executing each instruction in the program in turn for the threads of the warp (steps 118, 119 and 120).)

This will then be repeated until all the warps have executed the shader program (step 121).

As can be seen from FIG. 10, the effect of the operation shown in FIG. 10 is that only the first thread group executes the instructions before the set-entry instruction, with other thread groups then starting their execution of the shader program at the new entry point triggered by the set-entry instruction. This then means that only one thread group executes the common instructions for the program.

Figure 11:
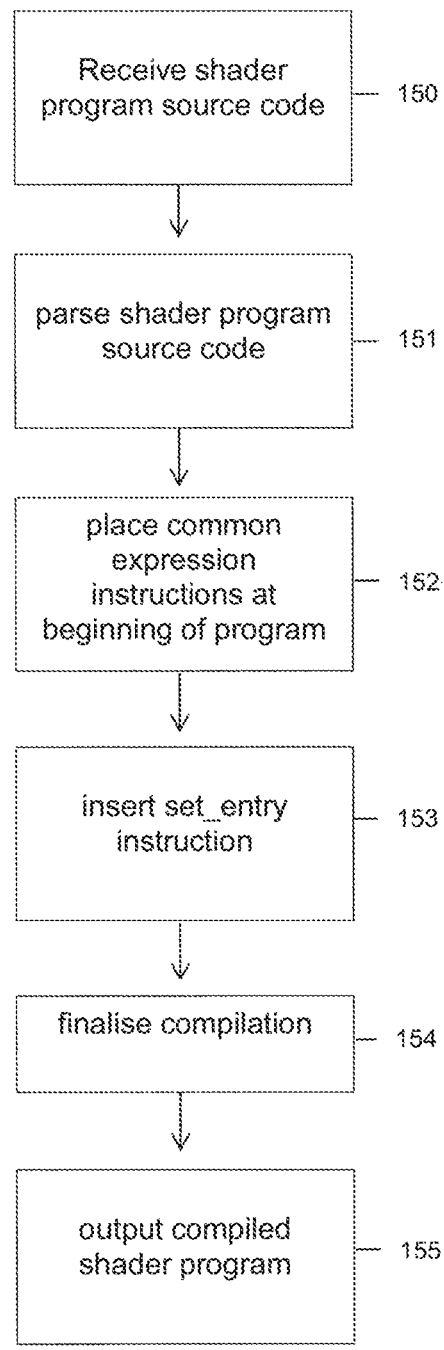
FIG. 11 shows schematically an embodiment of compiling a shader program in an embodiment of the technology described herein.

FIG. 11 shows schematically an embodiment of the operation of the compiler to include a set-entry instruction in a shader program to be executed by the programmable execution unit of a graphics processor.

The (shader) compiler will receive a shader program in a high level programming language to be compiled, and, as shown in FIG. 11, first parse the shader program source code and then operate to place instructions that correspond to common expressions in the shader program source code at the beginning of the program (steps 150, 151 and 152).

The compiler then inserts an appropriate set-entry instruction into the parsed and reordered program (step 153).

The compilation of the program is then finished (step 154), and the compiled shader program output, e.g. for execution (step 155).

Although the present embodiments have been described above with reference to the inclusion of only a single set-entry instruction in a shader program to be executed, it would be possible to include more than one set-entry instruction in a program, if desired.

For example, the sequence of instructions for a program could include an initial set of instructions to perform "global" common expressions (i.e. that will produce the same result for all threads (work items) of a set of threads (work items) that the program is to be executed for), followed by a first set-entry instruction, then followed by a set of instructions in the program that perform expressions that are common to (will produce the same result(s) for) a given work group within the set of work items that the shader program is to process, followed by a second set-entry instruction, followed by the main instruction sequence of the program that needs to be executed independently for each thread (work item). The plural different set-entry instructions would then allow threads to be able to start executing a program either at the beginning of the global common expressions, or at the beginning of the work group common expressions, or at the beginning of the main instruction sequence.

Again the execution of the different set-entry instructions could be tracked, e.g. by including and setting appropriate flags for each different set-entry instruction.

As will be appreciated from the above, the technology described herein, in its embodiments at least, can provide more efficient execution of a (shader) program. This is achieved, in embodiments of the technology described herein at least, by including set-entry instructions that change the entry point for the program execution in a program, thereby allowing execution threads to begin execution of the program at different points within the sequence of instructions of the program.

Whilst the foregoing detailed description has been presented for the purposes of illustration and description, it is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of operating a graphics processing system that comprises a graphics processor comprising a programmable execution unit operable to execute programs for execution threads to perform processing operations;

the method comprising:

including in a program to be executed by the programmable execution unit of the graphics processor, the program comprising a sequence of instructions to be executed, and having associated with it a start instruction indication, indicating the instruction in the sequence of instructions for the program at which execution of the program should be started by an execution thread:

a set-entry instruction, which, when executed by a thread, will cause the start instruction indication to be modified to indicate a different instruction in the sequence of instructions for the program at which execution of the program should be started by an execution thread;

the method further comprising:

issuing the program to the programmable execution unit of the graphics processor for execution; and executing the program for a set of plural execution threads;

wherein:

executing the program for the set of plural execution threads comprises:

for each execution thread executing the program, determining from the start instruction indication associated with the program, the instruction in the sequence of instructions for the program at which the thread should start execution of the program, and starting execution of the program for the thread at the indicated instruction; and an execution thread, when executing the program, in response to the set-entry instruction:

causing the start instruction indication to indicate a different instruction in the sequence of instructions for the program at which to start execution of the program, such that execution threads that start their execution of the program thereafter will start their execution of the program at the indicated different instruction in the instruction sequence.

2. The method of claim 1, wherein:

the start instruction indication initially indicates that execution threads should start their execution of the shader program at the start of the shader program; and execution of the set-entry instruction by a thread modifies the start instruction indication to indicate an instruction in the program that is after at least some instructions that perform common expressions in the program.

3. The method of claim 1, wherein:

the set-entry instruction is included in the sequence of instructions for the program after instructions for any program expressions that will produce a common result for all the threads of a set of threads that the program is to be executed for, and before any instructions for program expressions that are required to be executed for each thread individually.

4. The method of claim 1, wherein:

a copy of the start instruction indication for the program is used to determine which instruction of the program the execution threads should start their execution of the program at; and execution of the set-entry instruction by a thread modifies that copy of the start instruction indication to indicate a different instruction in the sequence of instructions for the program at which to start execution of the program.

5. The method of claim 1, comprising when executing the program for a set of execution threads:
issuing a single thread or group of threads of the set of execution threads to begin its execution at the beginning of the program; and
only issuing further execution threads or groups of execution threads of the set of execution threads to start their execution of the program once that single thread or group of execution threads has executed the set-entry instruction.

6. The method of claim 1, comprising:
tracking the execution of the set-entry instruction in the program by execution threads; and
releasing threads that are to begin the program at a later start point for execution when a thread executes the set-entry instruction in the program.

7. The method of claim 1, comprising:
including two or more set-entry instructions in the program to be executed, with each different set-entry instruction changing the start instruction indication to indicate a different instruction in the program at which threads should start their execution of the program.

8. The method of claim 1, wherein:
executing the program for the set of plural execution threads comprises:
issuing respective groups of plural threads of the set of plural threads to execute the program; and
for each group of execution threads executing the program, determining from the start instruction indication associated with the program, the instruction in the sequence of instructions for the program at which the threads of the group of threads should start their execution of the program, and starting execution of the program for the threads of the group of threads at the indicated instruction.

9. The method of claim 1, comprising:
at least one execution thread that starts its execution of the program at a first start point in the sequence of instructions for the program storing the results that it generates by execution of the instructions in registers for use by other threads that start their execution of the program at a later point in the sequence of instructions for the program.

10. A graphics processing system comprising:
a graphics processor comprising a programmable execution unit operable to execute programs for execution threads to perform processing operations; and
a processing circuit configured to:
associate with a program to be executed by the programmable execution unit of the graphics processor, the program comprising a sequence of instructions to be executed, a start instruction indication, indicating the instruction in the sequence of instructions for the program at which execution of the program should be started by an execution thread;
include in the program to be executed by the programmable execution unit of the graphics processor, a set-entry instruction, which, when executed by a thread, will cause the start instruction indication associated with the program to be modified to indicate a different instruction in the sequence of instructions for the program at which execution of the program should be started by an execution thread; and
issue the program to the programmable execution unit of the graphics processor for execution;
wherein:
the graphics processor comprises:
an execution thread issuing circuit configured to issue execution threads to the programmable execution unit; and
the programmable execution unit of the graphics processor is configured to, when executing the program for an execution thread:
determine from the start instruction indication associated with the program, the instruction in the sequence of instructions for the program at which the thread should start execution of the program, and start execution of the program for the execution thread at the indicated instruction; and
when an execution thread, when executing the program, executes the set-entry instruction:
cause the start instruction indication to indicate a different instruction in the sequence of instructions for the program at which to start execution of the program, such that execution threads that start their execution of the program thereafter will start their execution of the program at the indicated different instruction in the instruction sequence.

11. The system of claim 10, wherein:
the start instruction indication initially indicates that execution threads should start their execution of the shader program at the start of the shader program; and
execution of the set-entry instruction by a thread modifies the start instruction indication to indicate an instruction in the program that is after at least some instructions that perform common expressions in the program.

12. The system of claim 10, wherein:
the set-entry instruction is included in the sequence of instructions for the program after instructions for any program expressions that will produce a common result for all the threads of a set of threads that the program is to be executed for, and before any instructions for program expressions that are required to be executed for each thread individually.

13. The system of claim 10, wherein:
a copy of the start instruction indication for the program is used to determine which instruction of the program the execution threads should start their execution of the program at; and
execution of the set-entry instruction by a thread modifies that copy of the start instruction indication to indicate a different instruction in the sequence of instructions for the program at which to start execution of the program.

14. The system of claim 10, wherein the execution thread issuing circuit is configured to issue execution threads to the programmable execution unit by:
issuing a single thread or group of threads of the set of execution threads to begin its execution at the beginning of the program; and
only issuing further execution threads or groups of execution threads of the set of execution threads to start their execution of the program once that single thread or group of execution threads has executed the set-entry instruction.

15. The system of claim 10, comprising:
an instruction execution tracking circuit configured to track the execution of a set-entry instruction in a program by execution threads; and
wherein the execution thread issuing circuit is configured to:
release threads that are to begin a program at a later start point for execution when a thread executes the set-entry instruction in the program.

16. The system of claim 10, wherein the processing circuit is configured to:
include two or more set-entry instructions in a program to be executed, with each different set-entry instruction changing the start instruction indication to indicate a different instruction in the program at which threads should start their execution of the program.

17. The system of claim 10, wherein the execution thread issuing circuit is configured to:
issue respective groups of plural threads of the set of plural threads to execute the program; and
the programmable execution unit is configured to:
for each group of execution threads executing the program, determine from the start instruction indication associated with the program, the instruction in the sequence of instructions for the program at which the threads of the group of threads should start their execution of the program, and start execution of the program for the threads of the group of threads at the indicated instruction.

18. The system of claim 10, wherein executing shader program for the execution threads comprises:
at least one execution thread that starts its execution of the program at a first start point in the sequence of instructions for the program storing the results that it generates by execution of the instructions in registers for use by other threads that start their execution of the program at a later point in the sequence of instructions for the program.

19. A graphics processor comprising:
a programmable execution unit operable to execute programs for execution threads to perform processing operations; and
an execution thread issuing circuit configured to issue execution threads to the programmable execution unit;
wherein
the programmable execution unit of the graphics processor is configured to, when executing a program for an execution thread, the program comprising: a sequence of instructions to be executed; and having associated with it a start instruction indication, indicating the instruction in the sequence of instructions for the program at which execution of the program should be started by an execution thread; and including a set-entry instruction, which, when executed by a thread, will cause the start instruction indication associated with the program to be modified to indicate a different instruction in the sequence of instructions for the program at which execution of the program should be started by an execution thread:
determine from the start instruction indication associated with the program, the instruction in the sequence of instructions for the program at which the thread should start execution of the program, and start execution of the program for the execution thread at the indicated instruction;
and
when an execution thread, when executing the program, executes the set-entry instruction:
cause the start instruction indication to indicate a different instruction in the sequence of instructions for the program at which to start execution of the program, such that execution threads that start their execution of the program thereafter will start their execution of the program at the indicated different instruction in the instruction sequence.

20. A non-transitory computer readable storage medium storing computer software code which when executing on a processor performs a method of compiling a program to generate instructions for execution by a programmable execution unit of a graphics processor operable to execute programs for execution threads to perform processing operations, the method comprising:
including in a program to be executed by the execution unit of the graphics processor, the program comprising a sequence of instructions to be executed, and having associated with it a start instruction indication, indicating the instruction in the sequence of instructions for the program at which execution of the program should be started by an execution thread:
a set-entry instruction, which, when executed by a thread, will cause the start instruction indication associated with the program to be modified to indicate a different instruction in the sequence of instructions for the program at which execution of the program should be started by an execution thread.

* * * * *